United States Patent
Kuroda et al.

(10) Patent No.: US 9,073,546 B2
(45) Date of Patent: Jul. 7, 2015

(54) HYBRID VEHICLE DRIVING SYSTEM

(75) Inventors: Shigetaka Kuroda, Saitama (JP); Atsushi Hagihara, Saitama (JP); Hiroyuki Isegawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 139 days.

(21) Appl. No.: 13/704,202

(22) PCT Filed: Jun. 15, 2011

(86) PCT No.: PCT/JP2011/063744
§ 371 (c)(1),
(2), (4) Date: Dec. 13, 2012

(87) PCT Pub. No.: WO2011/158882
PCT Pub. Date: Dec. 22, 2011

(65) Prior Publication Data
US 2013/0096761 A1    Apr. 18, 2013

(30) Foreign Application Priority Data

Jun. 15, 2010    (JP) .................................. 2010-136541

(51) Int. Cl.
*B60W 20/00*    (2006.01)
*B60K 6/48*    (2007.10)
(Continued)

(52) U.S. Cl.
CPC .................. *B60W 20/20* (2013.01); *B60K 6/48* (2013.01); *B60K 6/547* (2013.01); *B60L 1/003* (2013.01); *B60L 11/14* (2013.01); *B60L 15/20* (2013.01);
(Continued)

(58) Field of Classification Search
CPC .................... F02D 13/08; F02D 17/00–17/04; B60W 20/10; B60W 20/00; B60W 20/20
See application file for complete search history.

(56) References Cited

U.S. PATENT DOCUMENTS

| | | |
|---|---|---|
| 2002/0033059 A1 | 3/2002 | Pels et al. |
| 2004/0035113 A1 | 2/2004 | Hanada et al. |

(Continued)

FOREIGN PATENT DOCUMENTS

| | | | |
|---|---|---|---|
| EP | 1366949 B1 | * | 11/2007 |
| JP | 2002-089594 A | | 3/2002 |

(Continued)

OTHER PUBLICATIONS

Office Action dated May 7, 2014, issued in Japanese Patent Application No. 2012-520482 (3 Pages).

*Primary Examiner* — Helal A Algahaim
*Assistant Examiner* — Genna Mott
(74) *Attorney, Agent, or Firm* — Westerman, Hattori, Daniels & Adrian, LLP

(57) ABSTRACT

A hybrid vehicle driving system 1 of the invention includes a cylinder deactivated operation necessity determination unit for determining the necessity of a cylinder deactivated operation of an engine 6 when a required driving force required on a vehicle is smaller than a driving force of the engine 6 that runs in the cylinder deactivated operation. When the cylinder deactivated operation is determined to be unnecessary by the cylinder deactivated operation necessity determination unit, the vehicle can be driven in an EV driving by disengaging a first clutch 41 and a second clutch 42, whereas when the cylinder deactivated operation is determined to be necessary by the cylinder deactivated operation necessity determination unit, the engine 6 runs in the cylinder deactivated operation and at least one of the first clutch 42 and the second clutch 42 is engaged.

10 Claims, 10 Drawing Sheets

(51) Int. Cl.

| | | |
|---|---|---|
| *B60K 6/547* | (2007.10) | |
| *B60L 1/00* | (2006.01) | |
| *B60L 11/14* | (2006.01) | |
| *B60L 15/20* | (2006.01) | |
| *B60W 10/06* | (2006.01) | |
| *B60W 10/08* | (2006.01) | |
| *F02D 29/02* | (2006.01) | |
| *F02D 29/06* | (2006.01) | |
| *B60W 10/115* | (2012.01) | |
| *F16H 3/00* | (2006.01) | |

(52) U.S. Cl.
CPC ...... *B60L 2240/421* (2013.01); *B60L 2240/423* (2013.01); *B60L 2240/441* (2013.01); *B60L 2240/545* (2013.01); *B60L 2270/145* (2013.01); *B60W 10/06* (2013.01); *B60W 10/08* (2013.01); *B60W 20/00* (2013.01); *F02D 29/02* (2013.01); *F02D 29/06* (2013.01); *Y02T 10/6221* (2013.01); *Y02T 10/6286* (2013.01); *Y02T 10/642* (2013.01); *Y02T 10/7077* (2013.01); *B60W 10/115* (2013.01); *B60W 2710/06* (2013.01); *Y10S 903/93* (2013.01); *B60W 2710/0633* (2013.01); *B60L 2260/24* (2013.01); *F16H 3/006* (2013.01); *Y02T 10/7275* (2013.01); *Y02T 10/70* (2013.01)

(56) References Cited

U.S. PATENT DOCUMENTS

| | | | |
|---|---|---|---|
| 2005/0139035 A1* | 6/2005 | Lee et al. ................... | 74/661 |
| 2005/0257967 A1* | 11/2005 | Vahabzadeh et al. ....... | 180/65.2 |
| 2010/0312430 A1* | 12/2010 | Troncoso et al. ............ | 701/29 |
| 2011/0021311 A1* | 1/2011 | Kim et al. ................... | 477/3 |

FOREIGN PATENT DOCUMENTS

| | | |
|---|---|---|
| JP | 2004-068759 A | 3/2004 |
| JP | 2006-074931 A | 3/2006 |
| JP | 2007-307995 A | 11/2007 |
| JP | 2008-261346 A | 10/2008 |
| JP | 2010-125936 A | 6/2010 |

* cited by examiner

<1ST EV MODE SECOND CLUTCH ENGAGEMENT 2ND ALL CYLINDER DEACTIVATED OPERATION>

HYBRID VEHICLE DRIVING SYSTEM

CROSS-REFERENCED TO RELATED APPLICATION

This application is a National Phase entry of International Application PCT/JP2011/063744, filed Jun. 15, 2011, which claims priority to Japanese Patent Application No. 2010-136541, filed Jun. 15, 2010, the disclosure of the prior application(s) are hereby incorporated in their entirety by reference.

TECHNICAL FIELD

The present invention relates to a hybrid vehicle driving system.

BACKGROUND ART

Conventionally, a vehicle driving system is known which includes an internal combustion engine, an electric motor, a first engaging and disengaging means and a second engaging and disengaging means (for example, refer to Patent Document 1).

As shown in FIG. 10, a vehicle driving system 200 of Patent Document 1 is a dual-clutch transmission which includes a first input shaft 202a that is connected to an electric motor 210 and which is selectively connected to an internal combustion engine output shaft 204 by a first engaging and disengaging means 205, a second input shaft 202b that is selectively connected to the internal combustion engine output shaft 204 by a second engaging and disengaging means 206, an output shaft 203 that outputs power to a driven portion, a first gearset that is disposed on the first input shaft 202a and which includes plural gears that are selectively connected to the first input shaft 202a via first synchronizing units 230, 231, a second gearsets that is disposed on the second input shaft 202b and which includes plural gears that are selectively connected to the second input shaft 202b via second synchronizing units 216, 217, and a third gearset that is disposed on the output shaft 203 and which includes plural gears that mesh with the gears of the first gearset and the gears of the second gearset.

RELATED ART DOCUMENT

Patent Document

Patent Document 1: JP-A-2007-307995

SUMMARY OF THE INVENTION

Problems to be Solved by the Invention

It is known that the vehicle is driven in the EV mode only by power of the electric motor by use of the transmission having the plural engaging and disengaging means with the drive shafts disengaged from the internal combustion engine by the engaging and disengaging means. However, when the required driving force is increased while the vehicle is being driven with the internal combustion engine disengaged by the engaging and disengaging means, the engaging and disengaging means need to be re-engaged in order to restart the internal combustion engine. However, controlling the transmission in that way causes fears that the response is deteriorated.

The invention has been made in view of the problem described above, and an object of the invention is to provide a hybrid vehicle driving system in which quick response and improved fuel economy are compatible.

Means for Solving the Problems

With a view to attaining the object, according to an invention of Claim 1, there is provided a hybrid vehicle driving system adapted to be used in a hybrid vehicle having as drive sources an internal combustion engine (for example, an engine 6 in an embodiment that will be described later) that can be switched to an all cylinder activated operation where all cylinders are activated for operation and a cylinder deactivated operation where at least part of the cylinders is deactivated for rest and an electric motor (for example, a motor 7 in the embodiment that will be described later) and including a transmission (for example, a transmission 20 in the embodiment that will be described later) having a battery (for example, a battery 3 in the embodiment that will be described later) that supplies electric power to the electric motor, a first change-speed mechanism where mechanical power from an output shaft of the internal combustion engine and the electric motor is borne by a first input shaft (for example, a first primary shaft 11 in the embodiment that will be described later) that engages with the electric motor and any of plural change-speed gears (for example, a third speed drive gear 23, a fifth speed drive gear 25 in the embodiment that will be described later) is engaged so that the first input shaft is engaged with driven wheels, a second change-speed mechanism where mechanical power from the output shaft of the internal combustion engine is borne by a second input shaft (for example, a second intermediate shaft 16 in the embodiment that will be described later) and any of plural change-speed gears (for example, a second speed drive gear 22, a fourth speed drive gear 24 in the embodiment that will be described later) is engaged so that the second input shaft is engaged with the driven wheels, a first engaging and disengaging portion (for example, a first clutch 41 in the embodiment that will be described later) that can engage the output shaft of the internal combustion engine with the first input shaft, and a second engaging and disengaging portion (for example, a second clutch 42 in the embodiment that will be described later) that can engage the output shaft of the internal combustion engine with the second input shaft, wherein the hybrid vehicle can be driven in an EV mode only by a driving force of the electric motor via the first input shaft, the hybrid vehicle driving system characterized by further including a cylinder deactivated operation necessity determination unit (for example, an ECU 5 in the embodiment that will be described later) for determining on the necessity of the internal combustion engine running in the cylinder deactivated operation when a required driving force required on the vehicle is smaller than a driving force resulting when the internal combustion engine runs in the cylinder deactivated operation, and characterized in that when the cylinder deactivated operation is determined to be unnecessary by the cylinder deactivated operation necessity determination unit, the vehicle can be driven in the EV mode by disengaging the first engaging and disengaging portion and the second engaging and disengaging portion, and in that when the cylinder deactivated operation is determined to be necessary by the cylinder deactivated operation necessity determination unit, the internal combustion engine runs in the cylinder deactivated operation and at least one of the first engaging and disengaging portion and the second engaging and disengaging portion is engaged.

According to an invention of claim 2, there is provided hybrid vehicle driving system as set forth in claim 1, characterized in that the cylinder deactivated operation necessity determination unit determines that the cylinder deactivated operation is necessary when a puddle paddle shift is selected.

According to an invention of Claim 3, there is provided a hybrid vehicle driving system as set forth in Claim 1, characterized in that the cylinder deactivated operation necessity determination unit determines that the cylinder deactivated operation is necessary when a sport mode is selected.

According to an invention of Claim 4, there is provided a hybrid vehicle driving system as set forth in any one of Claims 1 to 3, characterized in that the cylinder deactivated operation necessity determination unit determines that the cylinder deactivated operation is necessary when a regeneration of electric energy is executed by the electric motor.

According to an invention of Claim 5, there is provided a hybrid vehicle driving system as set forth in any one of Claims 1 to 3, characterized in that the cylinder deactivated operation necessity determination unit determines that the cylinder deactivated operation is necessary when the vehicle is cruising.

According to an invention of Claim 6, there is provided a hybrid vehicle driving system as set forth in anyone of Claims 1 to 5, characterized in that the cylinder deactivated operation necessity determination unit determines that the cylinder deactivated operation is necessary when the vehicle is coasting down.

According to an invention of Claim 7, there is provided a hybrid vehicle driving system as set forth in anyone of Claims 1 to 6, characterized in that when the vehicle is driven in the EV mode with the internal combustion engine running in the cylinder deactivated operation while keeping the first engaging and disengaging portion engaged, a pre-shifting to the second input shaft is implemented and the first engaging and disengaging portion is switched to the second engaging and disengaging portion for engagement with the second input shaft.

According to an invention of Claim 8, there is provided a hybrid vehicle driving system as set forth in Claim 1, characterized by including a driving state predicting unit (for example, the ECU 5 in the embodiment that will be described later) that liaises with a car navigation system, and characterized in that the cylinder deactivated operation necessity determination unit determines that the cylinder deactivated operation is necessary when a switching from the EV mode to a different driving mode is predicted by the driving state predicting unit.

According to an invention of Claim 9, there is provided a hybrid vehicle driving system as set forth in Claim 1, characterized by including an electronic control throttle (for example, an electronic control throttle 66 in the embodiment that will be described later) that can control the amount of induction air induced into the internal combustion engine, and characterized in that when the required driving force required on the vehicle is smaller than the driving force resulting when the internal combustion engine runs in the cylinder deactivated operation, a control is made so that the internal combustion engine runs in the cylinder deactivated operation and that an opening of the electronic control throttle is increased as the required driving force is increased, in that when the required driving force required on the vehicle is larger than the driving force of the internal combustion engine that runs in the cylinder deactivated operation and is smaller than a sum of the driving force of the internal combustion engine that runs in the cylinder deactivated operation and a driving force that can be outputted by the electric motor, a control is made so that the internal combustion engine runs in the cylinder deactivated operation and that the electric motor is made to output a difference between the required driving force and the driving force of the internal combustion engine that runs in the cylinder deactivated operation, and in that when the required driving force required on the vehicle is larger than the sum of the driving force of the internal combustion engine that runs in the cylinder deactivated operation and the driving force that can be outputted by the electric motor, a control is made so that the internal combustion engine is switched from the cylinder deactivated operation to an all cylinder activated operation and that the opening of the electronic control throttle is changed to an opening that corresponds to the all cylinder activated operation.

According to an invention of Claim 10, there is provided a hybrid vehicle driving system as set forth in Claim 1, characterized in that the cylinder deactivated operation includes a partial cylinder deactivated operation where the engine runs with only part of the cylinder deactivated for rest and an all cylinder deactivated operation where the engine runs with all the cylinders deactivated, in that when the required driving force required on the vehicle is smaller than a driving force of the internal combustion engine that runs in the all cylinder activated operation and a BSFC bottom operation is enabled by the internal combustion engine that runs in the partial cylinder deactivated operation, a control is made so that the internal combustion engine runs in the partial cylinder deactivated operation, and in that when the required driving force required on the vehicle is smaller than the driving force of the internal combustion engine that runs in the all cylinder activated operation and a difference therebetween is equal to or larger than a predetermined value, a control is made so that the vehicle is driven in the EV mode or the internal combustion engine runs in the all cylinder deactivated operation in accordance with a state of charge of the battery and the required driving force.

Advantage of the Invention

According to the invention of Claim 1, since the internal combustion engine is allowed to run in the cylinder deactivated operation as required when the required driving force required on the vehicle is smaller than the driving force of the internal combustion engine that runs in the cylinder deactivated operation, not only can the fuel economy be improved, but also the internal combustion engine can quickly be driven when the driving force of the internal combustion engine is necessary.

According to the invention of claim 2, when the paddle shift where quick response is required is selected, the internal combustion engine can quickly be driven again.

According to the invention of Claim 3, when the sport mode where quick response is required is selected, the internal combustion engine can quickly be driven again.

According to the invention of Claim 4, since the regeneration loss of energy can be reduced, not only can the fuel economy be improved further, but also the internal combustion engine can be driven again further quickly.

According to the invention of Claim 5, even when a gear change for kickdown is implemented, a stable driving can be implemented with good response without generating any shock.

According to the invention of Claim 6, even when a gear change for chip-in is implemented, a stable driving can be implemented with good response without generating any shock.

According to the invention of Claim 7, the internal combustion engine can quickly be driven again in the next higher gear.

According to the invention of Claim 8, since the internal combustion engine is allowed to run in the cylinder deactivated operation when the switching from the EV mode to the different driving mode can be predicted early by the navigation system, even when the driving force of the internal combustion engine comes to be actually required, the internal combustion engine can quickly be driven again.

According to the inventions of Claims 9, and 10, since the running state of the internal combustion engine can be switched in accordance with the required driving force, the fuel economy can be improved furthermore.

MODES FOR CARRYING OUT THE INVENTION

Hereinafter, an embodiment of a hybrid vehicle driving system of the invention will be described by reference to FIG. 1.

Figure 1:
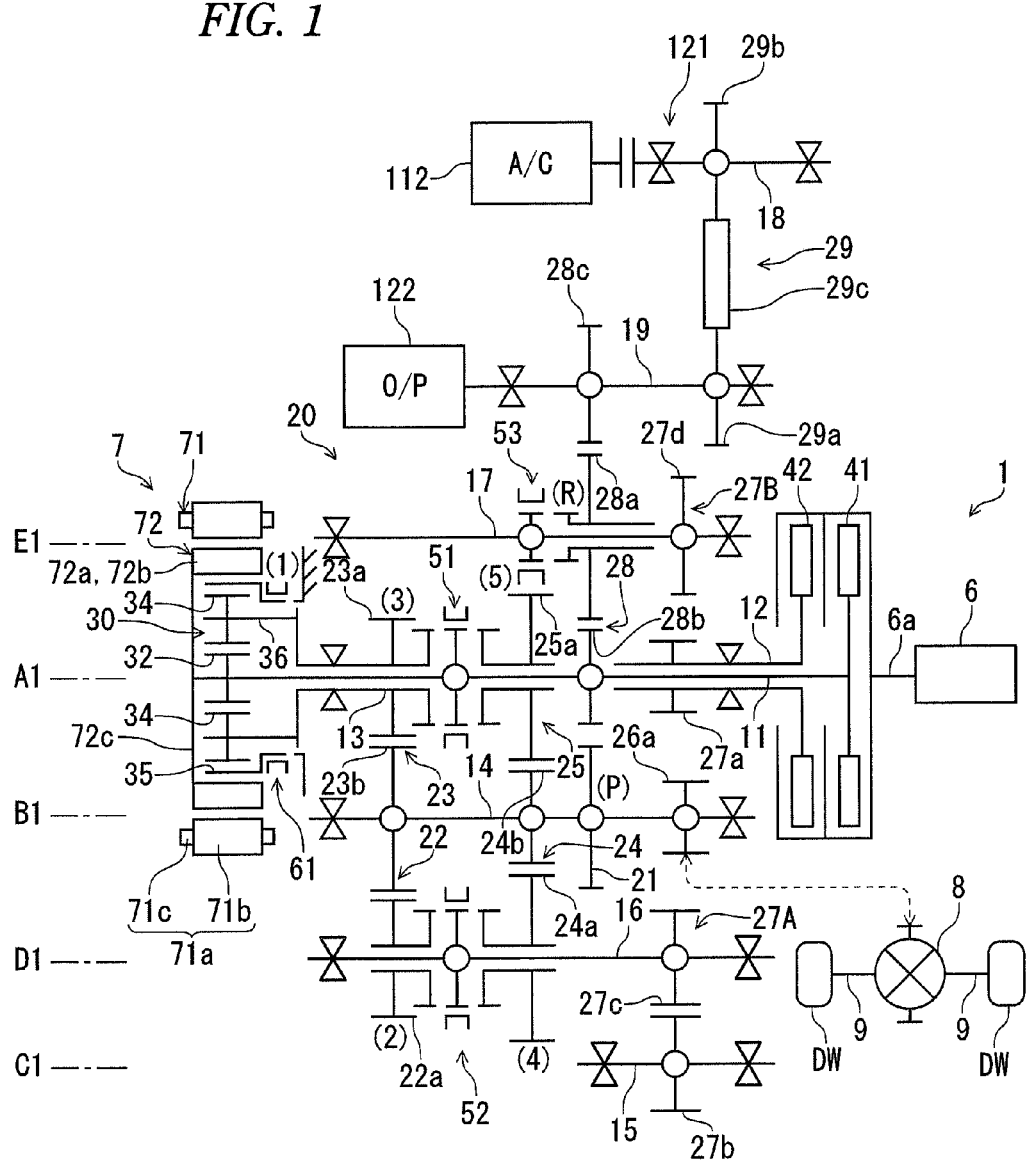
FIG. 1 is a schematic block diagram of a hybrid vehicle driving system of the invention.

As shown in FIG. 1, a hybrid vehicle 1 of an embodiment is designed to drive driven wheels DW, DW (driven portions) via drive shafts 9, 9 of the vehicle 1 and includes an internal combustion engine (hereinafter, referred to as an "engine") 6 and an electric motor (hereinafter, referred to as a "motor") 7, which are drive sources, as well as a transmission 20 that transmits power to the driven wheels DW, DW.

The engine 6 is, for example, an SOHC V6 engine, and a crankshaft 6a of this engine 6 carries a first clutch (a first engaging and disengaging means) 41 and a second clutch (a second engaging and disengaging means) 42 of the transmission 20. Note that the engine 6 may include a VTEC (a registered trade mark: variable valve mechanism) and that cylinders may be arranged in series or horizontal. Additionally, the number of cylinders of the engine 6 is not limited to six and can be selected as required in accordance with horsepower required.

The motor 7 is a three-phase brushless DC motor and has a stator 71 that is made up of 3n armatures 71a and a rotor 72 that is disposed opposite to the stator 71. Each armature 71a includes an iron core 71b and a coil 71c that is wound round this iron core 71b. The armatures 71a are fixed to a casing, not shown, and are aligned at substantially equal intervals in a circumferential direction about a rotational shaft. 3n coils 71c make up n sets of coils of three phases including a U phase, a V phase and a W phase.

The rotor 72 has an iron core 72a and n permanent magnets 72b which are aligned at substantially equal intervals in a circumferential direction about the rotational shaft. Polarities of any two adjacent permanent magnets 72b are different from each other. A fixing portion 72c that fixes the iron core 72a in place has a hollow cylindrical shape, is disposed on an outer circumferential side of a ring gear 35 of a planetary gear mechanism 30, which will be described later, and is connected to a sun gear 32 of the planetary gear mechanism 30. Thus, the rotor 72 is made to rotate together with the sun gear 32 of the planetary gear mechanism 30.

The planetary gear mechanism 30 has the sun gear 32, the ring gear 35 which is disposed so as not only to be concentric with the sun gear 32 but also to surround the periphery of the sun gear 32, planetary gears 34 which are in mesh with the sun gear 32 and the ring gear 35 and a carrier 36 which supports the planetary gears 34 so as to allow them not only to rotate on their own axes but also to walk around the sun gear 32. Thus, the sun gear 32, the ring gear 35 and the carrier 36 are made to rotate differentially relative to each other.

A brake mechanism 61 that is made to stop (lock) the rotation of the ring gear 35 is provided on the ring gear 35. Note that a lock mechanism may be used in place of the brake mechanism 61.

The transmission 20 is a so-called dual-clutch transmission that includes the first clutch 41, the second clutch 42 and the planetary gear mechanism 30, which have been described before, as well as plural change-speed gearsets, which will be described later.

More specifically, the transmission 20 includes a first primary shaft 11 (a first input shaft) that is disposed coaxially with the crankshaft 6a of the engine 6 (a rotational axis A1), a second primary shaft 12, a connecting shaft 13, a counter shaft 14 (output shaft) that is rotatable about a rotational axis B1 disposed parallel to the rotational axis A1, a first intermediate shaft 15 that is rotatable about a rotational axis C1 disposed parallel to the rotational axis A1, a second intermediate shaft 16 (a second input shaft) that is rotatable about a rotational axis D1 disposed parallel to the rotational axis A1 and a reverse shaft 17 that is rotatable about a rotational axis E1 disposed parallel to the rotational axis A1.

The first clutch 41 is provided on the first primary shaft 11 at an end lying to face the engine 6, and the sun gear 32 of the planetary gear mechanism 30 and the rotor 72 of the motor 7 are mounted on an end of the primary main shaft 11 which lies opposite to the end facing the engine 6. Consequently, the primary shaft 11 is selectively connected to the crankshaft 6a of the engine 6 by the first clutch 41 and is connected directly to the motor 7, thus power of the engine 6 and/or the motor 7 being transmitted to the sun gear 32.

The second primary shaft 12 is formed shorter than the first primary shaft 11 and hollow and is disposed so as to rotate relative to the first primary shaft 11 while surrounding the periphery of an end portion of the first primary shaft 11 which lies to face the engine 6. Additionally, the second clutch 42 is provided at an end of the second primary shaft 12 which lies to face the engine 6, and an idle drive gear 27a is mounted integrally on an end portion of the second primary shaft 12 which lies opposite to the end facing the engine 6. Consequently, the second primary shaft 12 is selectively connected to the crankshaft 6a of the engine 6 by the second clutch 42, so that power of the engine 6 is transmitted to the idle drive gear 27a.

The connecting shaft 13 is formed shorter than the first primary shaft 11 and hollow and is disposed so as to rotate relative to the first primary shaft 11 while surrounding the periphery of an end portion of the first primary shaft 11 which lies opposite to the end facing the engine 6. Additionally, a third speed drive gear 23a is mounted integrally on an end portion of the connecting shaft 13 which lies to face the engine 6, and the carrier 36 of the planetary gear mechanism 30 is mounted on an end portion of the connecting shaft 13 which lies opposite to the end portion lying to face the engine 6. Consequently, the carrier 36 and the third speed drive gear 23a which are mounted on the connecting shaft 13 are made to rotate together when the planetary gears 34 walk around the sun gear 32.

Further, a fifth speed drive gear 25a, which is adapted to rotate freely relative to the first primary shaft 11, and a reverse driven gear 28b, which is adapted to rotate together with the first primary shaft 11, are provided on the first primary shaft 11 between the third speed drive gear 23a mounted on the connecting shaft 13 and the idle drive gear 27a mounted on the second primary shaft 12. Further, a first gear shift shifter 51 is provide between the third speed drive gear 23a and the fifth speed drive gear 25a, and this first gear shift shifter 51 connects or disconnects the first primary shaft 11 with or from the third speed drive gear 23a or the fifth speed drive gear 25a. Then, when the first gear shift shifter 51 is engaged in a third speed engaging position, the first primary shaft 11 is connected to the third speed drive gear 23a so as to rotate together therewith. When the first gear shift shifter 51 is engaged in a fifth speed engaging position, the first primary shaft 11 rotates together with the fifth speed drive gear 25a. When the first gear shift shifter 51 is in a neutral position, the first primary shaft 11 rotates relative to the third speed drive gear 23a and the fifth speed drive gear 25a. When the first primary shaft 11 and the third speed drive gear 23a rotate together, the sun gear 32 that is mounted on the first primary shaft 11 rotates together with the carrier 36 that is connected to the third speed drive gear 23a via the connecting shaft 13, and the ring gear 35 also rotate together therewith, whereupon the planetary gear mechanism 30 is brought into a solid unit.

A first idle driven gear 27b is mounted integrally on the first intermediate shaft 15, and this first idle driven gear 27b meshes with the idle drive gear 27a that is mounted on the second primary shaft 12.

A second idle driven gear 27c is mounted integrally on the second intermediate shaft 16, and the second idle driven gear 27c meshes with the first idle driven gear 27b that is mounted on the first intermediate shaft 15. The second idle driven gear 27c makes up a first idle gear train 27A together with the idle drive gear 27a and the first idle driven gear 27b which have been described before. Additionally, a second speed drive gear 22a and a fourth speed drive gear 24a are provided on the second intermediate shaft 16 in positions which correspond, respectively, to the third speed drive gear 23a and the fifth speed drive gear 25a which are provided around the first primary shaft 11, the second speed drive gear 22a and the fourth speed drive gear 24a being individually made to rotate relative to the second intermediate shaft 16. Further, a second gear shift shifter 52 is provided on the second intermediate shaft 16 between the second speed drive gear 22a and the fourth speed drive gear 24a, and this second gear shift shifter 52 connects or disconnects the second intermediate shaft 16 with or from the second speed drive gear 22a or the fourth speed drive gear 24a. Then, when the second gear shift shifter 52 is engaged in a second speed engaging position, the second intermediate shaft 16 rotates together with the second speed drive gear 22a. When the second gear shift shifter 52 is engaged in a fourth speed engaging position, the second intermediate shaft 16 rotates together with the fourth speed drive gear 24a. When the second gear shift shifter 52 is in a neutral position, the second intermediate shaft 16 rotates relative to the second speed drive gear 22a and the fourth speed drive gear 24a.

A first common driven gear 23b, a second common driven gear 24b, a parking gear 21 and a final gear 26a are mounted integrally on the counter shaft 14 sequentially in that order as seen from an opposite end of the counter shaft 14 to an end which lies to face the engine 6.

Here, the first common driven gear 23b meshes with the third speed drive gear 23a that is mounted on the connecting shaft 13 and then makes up a third speed gear pair 23 together with the third speed drive gear 23a and meshes with the second speed drive gear 22a that is provided on the second intermediate shaft 16 and then makes up a second speed gear pair 22 together with the second speed drive gear 22a.

The second common driven gear 24b meshes with the fifth speed drive gear 25a that is provided on the first primary shaft 11 and then makes up a fifth speed gear pair 25 together with the fifth speed drive gear 25a and meshes with the fourth speed drive gear 24a that is provided on the second intermediate shaft 16 and then makes up a fourth speed gear pair 24 together with the fourth speed drive gear 24a.

The final gear 26a meshes with the differential gear mechanism 8, and the differential gear mechanism 8 is connected to the driven wheels DW, DW via drive shafts 9, 9. Consequently, power that is transmitted to the counter shaft 14 is outputted from the final gear 26a to the differential gear mechanism 8, the drive shafts 9, 9 and the driven wheels DW, DW.

A third idle driven gear 27d is mounted integrally on the reverse shaft 17, and this third idle driven gear 27d meshes with the first idle driven gear 27b that is mounted on the first intermediate shaft 15. The third idle driven gear 27d makes up a second idle gear train 27B together with the idle drive gear 27a and the first idle driven gear 27b which have been described before. Additionally, a reverse drive gear 28a is provided on the reverse shaft 17 so as to rotate relative to the reverse shaft 17, and this reverse drive gear 28a meshes with a reverse driven gear 28b that is mounted on the first primary shaft 11. The reverse drive gear 28a makes up a reverse gear train 28 together with the reverse driven gear 28b. Further, a reverse shifter 53 is provided on the reverse shaft 17 in a position lying on a side of the reverse drive gear 28a which lies opposite to a side facing the engine 6. This reverse shifter 53 connects or disconnects the reverse shaft 17 with or from the reverse drive gear 28a. Then, when the reverse shifter 53 is engaged in a reverse engaging position, the reverse shaft 17 rotates together with the reverse drive gear 28a, and when the reverse shifter 53 is in a neutral position, the reverse shaft 17 rotates relative to the reverse drive gear 28a.

Note that the first gear shift shifter 51, the second gear shift shifter 52 and the reverse shifter 53 employ clutch mechanisms having a synchronizing mechanism (a synchronizer mechanism) for matching the rotational speeds of a shaft and a gear which are connected together thereby.

In the transmission 20 that is configured as has been described heretofore, an odd-numbered gearset (a first gearset) made up of the third speed drive gear 23a and the fifth speed drive gear 25a is provided on the first primary shaft 11, which is one change-speed shaft of two change-speed shafts, and an even-numbered gearset (a second gearset) made up of the second speed drive gear 22a and the fourth speed drive gear 24a is provided on the second intermediate shaft 16, which is the other change-speed shaft of the two change-speed shafts.

Additionally, an air conditioner compressor 112 and an oil pump 122 are further provided in the hybrid vehicle driving system 1. The oil pump 122 is mounted on an oil pump auxiliary shaft 19 that is disposed parallel to the rotational axes A1 to E1 so as to rotate together with the oil pump auxiliary shaft 19. An oil pump driven gear 28c that meshes with the reverse drive gear 28a and an air conditioner drive gear 29a are mounted on the oil pump auxiliary shaft 19 so as to rotate together therewith, and power of the engine 6 and/or the motor 7 which rotates the first primary shaft 11 is transmitted thereto.

In addition, the air conditioner compressor 112 is provided on an air conditioner auxiliary shaft 18 that is disposed parallel to the rotational axes A1 to E1 via an air conditioner clutch 121. An air conditioner driven gear 29b, to which power is transmitted from the air conditioner drive gear 29a via a chain 29c, is mounted on the air conditioner auxiliary shaft 18 so as to rotate together with the air conditioner auxiliary shaft 18, whereby the power of the engine 6 and/or the motor 7 is transmitted from the oil pump auxiliary shaft 19 via an air conditioner transmission mechanism 29 that is made up of the air conditioner drive gear 29a, the chain 29c and the air conditioner driven gear 29b. Note that transmitting power to the air conditioner compressor 112 is enabled or disabled by applying or releasing the air conditioner clutch 121 by an air conditioner actuating solenoid, not shown.

Thus, according to the configuration that has been described heretofore, the hybrid vehicle driving system 1 of this embodiment has the following first to fifth transmission lines.

(1) A first transmission line is a transmission line in which the crankshaft 6a of the engine 6 is connected to the driven wheels DW, DW via the first primary shaft 11, the planetary gear mechanism 30, the connecting shaft 13, the third speed gear pair 23 (the third speed drive gear 23a, the first common driven gear 23b), the counter shaft 14, the final gear 26a, the differential gear mechanism 8 and the drive shafts 9, 9. Here, a reduction ratio of the planetary gear mechanism 30 is set so that engine torque that is transmitted to the driven wheels DW, DW by way of the first transmission line corresponds to a first speed. Namely, the reduction ratio of the planetary gear mechanism 30 is set so that a reduction ratio resulting from multiplication of the reduction ratio of the planetary gear mechanism 30 by the gear ratio of the third speed gear pair 23 corresponds to the first speed.

(2) A second transmission line is a transmission line in which the crankshaft 6a of the engine 6 is connected to the driven wheels DW, DW via the second primary shaft 12, the first idle gear train 27A (the idle drive gear 27a, the first idle driven gear 27b, the second idle driven gear 27c), the second intermediate shaft 16, the second speed gear pair 22 (the second speed drive gear 22a, the first common driven gear 23b) or the fourth speed gear pair 24 (the fourth speed drive gear 24a, the second common driven gear 24b), the counter shaft 14, the final gear 26a, the differential gear mechanism 8 and the drive shafts 9, 9.

(3) A third transmission line is a transmission line in which the crankshaft 6a of the engine 6 is connected to the driven wheels DW, DW via the first primary shaft 11, the third speed gear pair 23 (the third speed drive gear 23a, the first common driven gear 23b) or the fifth speed gear pair 25 (the fifth speed drive gear 25a, the second common driven gear 24b), the counter shaft 14, the final gear 26a, the differential gear mechanism 8 and the drive shafts 9, 9 without involving the planetary gear mechanism 30.

(4) A fourth transmission line is a transmission line in which the motor 7 is connected to the driven wheels DW, DW via the planetary gear mechanism 30 or the third speed gear pair 23 (the third speed drive gear 23a, the first common driven gear 23b) or the fifth speed gear pair 25 (the fifth speed drive gear 25a, the second common driven gear 24b), the counter shaft 14, the final gear 26a, the differential gear mechanism 8 and the drive shafts 9, 9.

(5) A fifth transmission line is a transmission line in which the crankshaft 6a of the engine 6 is connected to the driven wheels DW, DW via the second primary shaft 12, the second idle gear train 27B (the idle drive gear 27a, the first idle driven gear 27b, the third idle driven gear 27d), the reverse shaft 17, the reverse gear train 28 (the reverse drive gear 28a, the reverse driven gear 28b), the planetary gear mechanism 30, the connecting shaft 13, the third speed gear pair 23 (the third speed drive gear 23a, the first common driven gear 23b), the counter shaft 14, the final gear 26a, the differential gear mechanism 8 and the drive shafts 9, 9.

Figure 2:
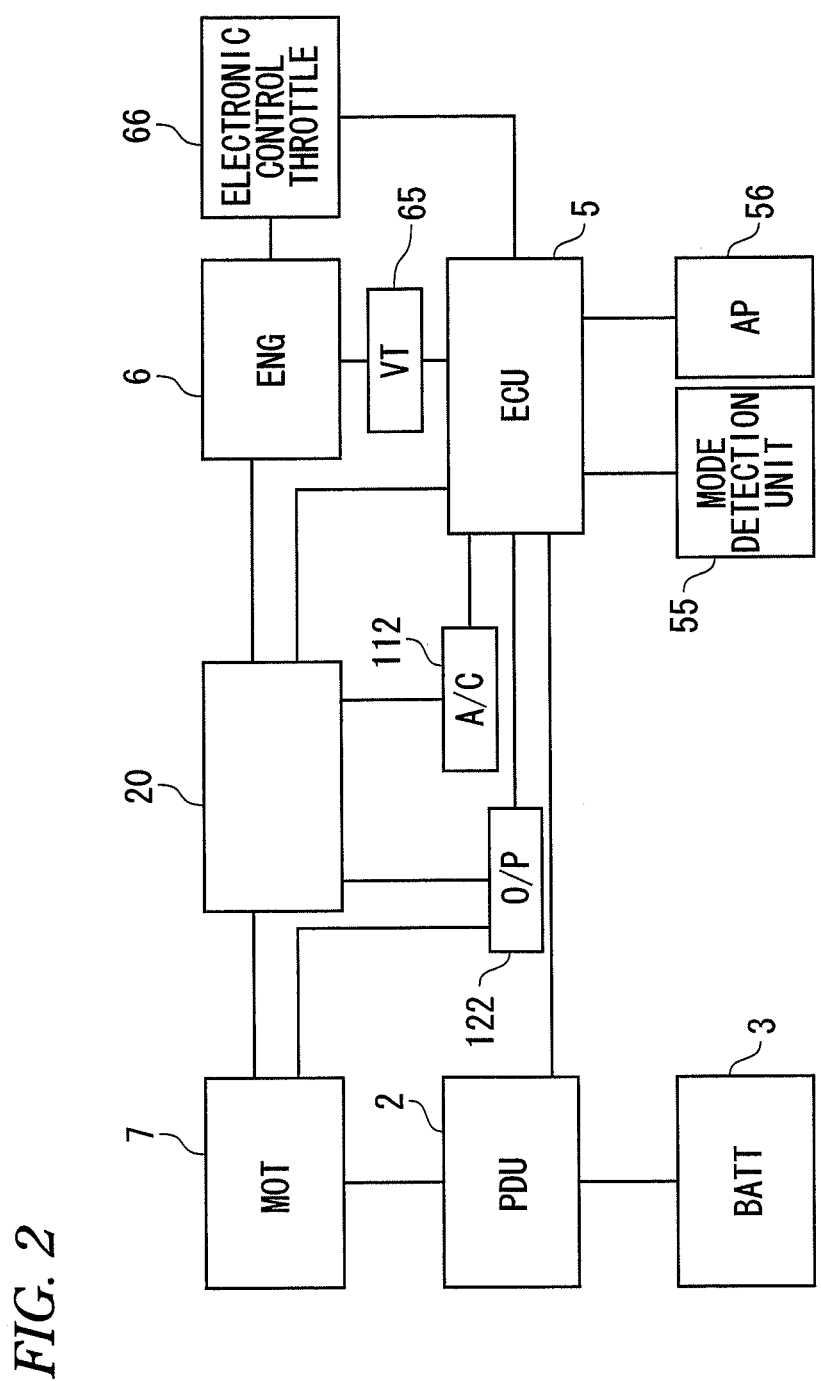
FIG. 2 is a schematic block diagram of a control system of the hybrid vehicle driving system shown in FIG. 1.

In addition, as shown in FIG. 2, in the hybrid vehicle driving system 1 of this embodiment, the motor 7 is connected to a power control unit (hereinafter, referred to as PDU) 2. The PDU 2 is connected to the battery 3 that supplies electric power to the motor 7 or which is charged with electric power from the motor 7. The motor 7 is driven by electric power that is supplied thereto from the battery 3 via the PDU 2. In addition, the motor 7 can regenerate electric energy through rotation of the driven wheels DW, DW while the vehicle is decelerated or by power of the engine 6 for storage in the battery 3 (energy recovery). Further, the PDU 2 is connected to an electric control unit (hereinafter, referred to as ECU) 5. An electronic control throttle (ETCS: Electronic Throttle Control System) 66 that electronically controls a throttle valve (not shown) is connected to the engine 6 to directly and electronically control the throttle valve in accordance with a throttle opening that is calculated by the ECU 5 so as to control the amount of induction air into the engine 6. The ECU 5 is a control unit that controls the whole of the vehicle in various ways and is connected with a mode detection unit 55 and an accelerator pedal opening detection unit (AP) 56.

Inputted into the ECU 5 are an acceleration request, a braking request, an engine rotational speed, a motor rotational speed, states of the battery 3 including a state of charge (SOC) and temperature thereof, information from the mode detection unit 55, information on an accelerator pedal opening that is detected by the accelerator pedal opening detection unit 56, rotational speeds of the first an second primary shafts 11, 12, a rotational speed of the counter shaft 14, a vehicle speed, gears, and shift positions. On the other hand, outputted from the ECU 5 are a signal that controls the engine 6, a signal that controls the PDU 2, a signal that controls the motor 7, signals indicative of generated state, charged state and discharged state of the battery 3, signals that control the first and second gear shift shifters 51, 52 and the reverse shifter 53, a signal that controls the application (locking) and release (neutralizing) of the brake mechanism 61 and an output signal that controls the application and release of the air conditioner clutch 121.

Figure 3:
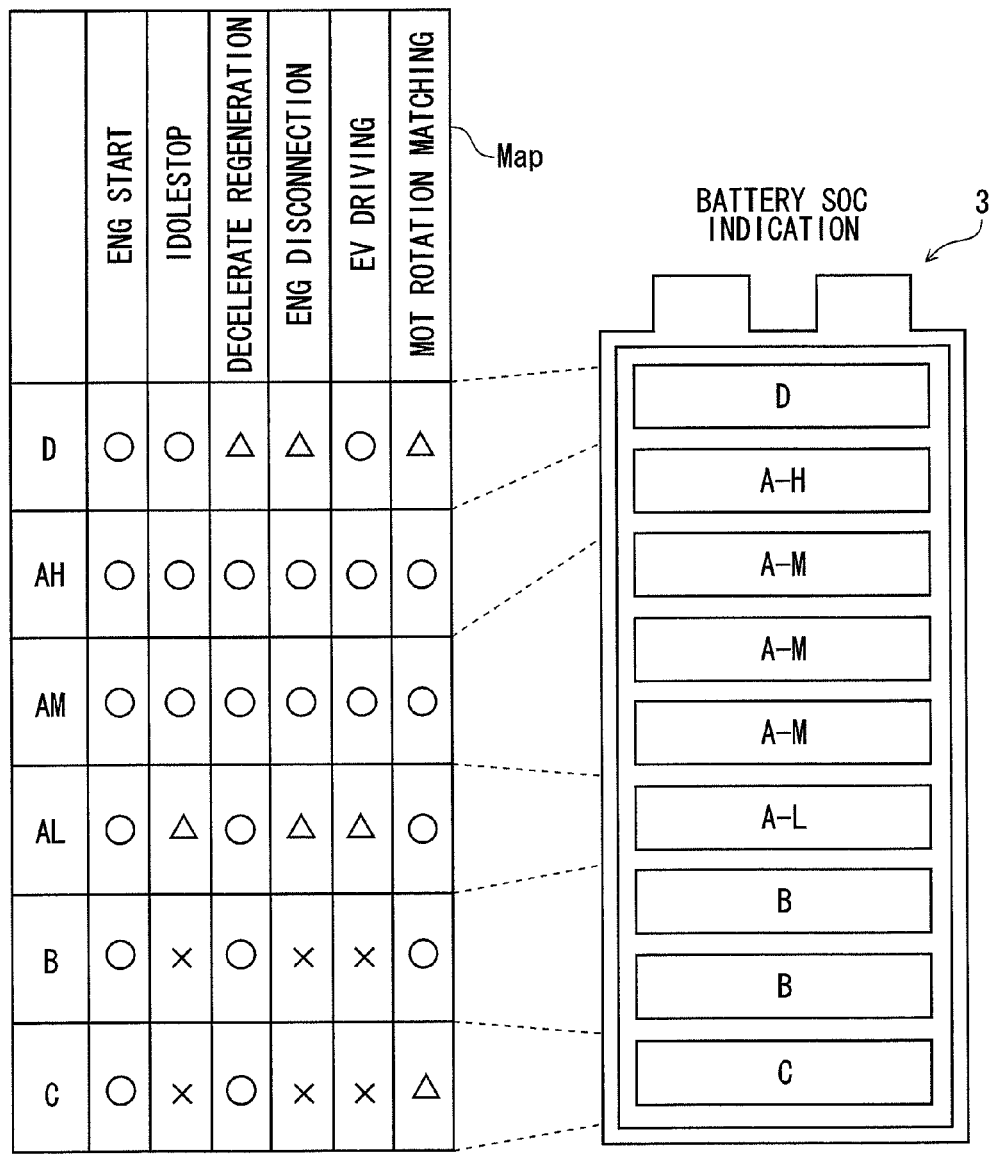
FIG. 3 is an explanatory diagram of a standard control map.

Additionally, the ECU 5 has a control map (Map) as shown in FIG. 3 for determination on whether or not various controls can be executed in accordance with the SOC of the battery 3. Basically, the ECU 5 determines based on this control map on the execution of ENG start, idle stop, decelerated regeneration, ENG disconnection, EV mode driving and MOT rotational speed matching. Note that in FIG. 3, ○ denotes that the respective events can be executed, x denotes that the respective events are prohibited and Δ denotes that the events can be executed on certain conditions.

In this control map Map, the SOC is classified into four zones of C, B, A and D in an incremental order, and further, the zone A is, in turn, classified into three zones of A-L, A-M and A-H in an incremental order, thus the SOC being classified into six zones in total. In addition, the ECU 5 controls so that in the zone D where the SOC is close to a maximum charged capacity, decelerated regeneration and ENG disconnection are permitted conditionally, in the zones B and C, EV driving and idle stop are prohibited, and the zone A-M constitutes a target charged capacity.

With the hybrid vehicle driving system 1 that is configured in the way described heretofore, the vehicle can be driven forwards in the first and fifth speed drivings while being allowed to be reversed by controlling the engagement and disengagement of the first and second clutches 41, 42 and also controlling engagement positions of the first gear shift shifter 51, the second gear shift shifter 52, the brake mechanism 61 and the reverse shifter 53.

In the first speed driving, the first clutch 41 is applied and the brake system 61 is engaged, whereby the driving force is transmitted to the driven wheels DW, DW by way of the first transmission line. In the second speed driving, the second clutch 42 is applied and the second gear shift shifter 52 is engaged in the second speed engaging position, whereby the driving force is transmitted to the driven wheels DW, DW by way of the second transmission line. In the third speed driving, the first clutch 41 is applied and the first gearshift shifter 51 is engaged in the third speed engaging position, whereby the driving force is transmitted to the driven wheels DW, DW by way of the third transmission line.

Additionally, in the fourth speed driving, the second gear shift shifter 52 is engaged in the fourth speed engaging position, whereby the driving force is transmitted to the driven wheels DW, DW by way of the second transmission line. In the fifth speed driving, the first gear shift shifter 51 is engaged in the fifth speed engaging position, whereby the driving force is transmitted to the driving wheels DW, DW by way of the second transmission line. Further, the second clutch 42 is applied and the reverse shifter 53 is engaged, whereby the vehicle is reversed by the driving force transmitted by way of the fifth transmission line.

These change-speed gears are changed by the ECU 5 based on a required driving force required on the vehicle that is calculated in accordance with an accelerator pedal opening detected by the accelerator pedal opening detection unit 56, a driving mode detected by the mode detection unit 55, a shift position and a vehicle speed. In addition to this, in the hybrid vehicle driving system 1 of this embodiment, the operating state of the engine 6 can be switched based on the required driving force required on the vehicle.

Here, as has been described before, in the hybrid vehicle driving system 1 of this embodiment, the engine 6 is the V6 engine and includes a variable valve timing mechanism (VT) 65 that enables an operation with a cylinder or cylinders deactivated. The six cylinders are constructed so as to hold a closed state by the variable valve timing mechanism 65. Specifically, in response to a command from the ECU 5, the variable valve timing mechanism 65 disconnects a cam lifting rocker arm (not shown) from a valve driving rocker arm (not shown), which are driven together during operation, of a cylinder or cylinders that are to be deactivated for rest so that an intake valve and an exhaust valve of the cylinder or cylinders are held closed. In this way, the variable valve timing mechanism 65 controls the rocker arms of each of the cylinders based on a required driving force required on the vehicle that is calculated based on a pedal effort applied to the accelerator pedal by the driver or a driving condition of the vehicle in response to the command from the ECU 5, whereby the operation of the engine 6 is switched to an all cylinder deactivated operation where all the six cylinders are deactivated for rest, a partial cylinder deactivated operation where part of the cylinders is deactivated for rest and an all cylinder activated operation where all the six cylinders are driven.

Consequently, when the required driving force required on the vehicle is not so large, for example, when the required driving force is smaller than an output that can be outputted by the engine 6 that is in the partial cylinder deactivated operation, in response to a command of the ECU 5, the opening of the electronic control throttle is changed to an opening that corresponds to the partial cylinder deactivated operation, whereby the vehicle can be driven in the engine driving with the engine 6 controlled to run in the partial cylinder deactivated operation by the variable valve timing mechanism 65. By driving the vehicle with the engine 6 running in the partial cylinder deactivated operation, not only can the pumping loss be reduced, but also the fuel consumption can be reduced, thereby making it possible to improve the fuel economy. As long as the required driving force required on the vehicle is smaller than the output that can be outputted by the engine 6 running in the partial cylinder deactivated operation, the engine 6 should be controlled to run in the partial cylinder deactivated operation and the opening of the electronic control throttle should be controlled to increase as the required driving force increases.

Additionally, even when the required driving force required on the vehicle is larger than the output that can be outputted by the engine 6 that runs in the partial cylinder deactivated operation, the partial cylinder deactivated operation of the engine 6 can continue by assisting the engine to drive the vehicle by an output from the motor 7. Consequently, when the required driving force required on the vehicle is smaller than a sum of the output that can be outputted by the engine 6 that runs in the partial cylinder deactivated operation and the output of the motor 7, the ECU 5 controls so that the engine 6 runs in the partial cylinder deactivated operation and the motor 7 outputs power corresponding to a difference between the output that is outputted by the engine 6 that runs in the partial cylinder deactivated operation and the required driving force.

Then, when the required driving force required on the vehicle exceeds the sum of the output that can be outputted by the engine 6 running in the partial cylinder deactivated operation and the output of the motor 7, the operation of the engine 6 is switched to the all cylinder activated operation, and the opening of the electronic control throttle is changed to an opening that corresponds to the all cylinder activated operation. In this way, according to the hybrid vehicle driving system 1 of this embodiment, the operating state of the engine 6 can be switched as required in accordance with the required driving force required on the vehicle, thereby making it possible to improve the fuel economy.

Additionally, even with the engine 6 running in the all cylinder activated operation, when electric energy is regenerated while the vehicle is being decelerated, the engine 6 is allowed to temporarily run in the partial cylinder deactivated operation or the all cylinder deactivated operation. When the engine is caused to run in the cylinder deactivated operation while electric energy is regenerated, no energy is consumed by the driving of the engine 6 and the friction can be reduced, and therefore, since the regeneration loss of energy can be reduced. Thus, more energy can be obtained by the generation of electric energy, and the fuel economy can be improved further. Moreover, braking force can also be obtained quickly.

In particular, when the vehicle is decelerated while being driven in an even-numbered gear, for example, in a second speed gear with the second clutch 42 applied, for example, the first gear shift shifter 51 is engaged with the third speed drive gear 23a to thereby rotate the rotor 72 for regeneration of electric energy. When the engine 6 is running then in the part or all cylinder deactivated operation, since no energy is consumed by the driving of the engine 6, the fuel economy can be improved, and further, the braking force can also be obtained quickly. Additionally, since the regeneration of electric energy can be executed with the second clutch 42 kept applied, when attempting to accelerate the vehicle again, the vehicle can quickly be restored to the second speed driving.

Incidentally, in the hybrid vehicle driving system 1 of this embodiment, by engaging the brake mechanism 61 or pre-shifting the first and second gear shift shifters 51, 52 while the vehicle is driven in the engine driving the motor 7 is allowed to assist the engine 6 to drive the vehicle or to execute the regeneration. Further, even while the engine 6 is idling, the engine 6 can be started by the motor 7 or the battery 3 can be charged. Furthermore, the vehicle can be driven in the EV driving by the motor 7 by disengaging the first and second clutches 41, 42.

As driving modes in the EV driving, there exist a first speed EV driving mode where the vehicle is driven by the driving force transmitted by way of the fourth transmission line with the brake mechanism 61 engaged, a third speed EV driving mode where the vehicle is driven by the driving force transmitted by way of the fourth transmission line with the first gear shift shifter 51 engaged in the third speed engaging position, and a fifth speed EV driving mode where the vehicle is driven by the driving force transmitted by way of the fourth transmission line with the first gear shift shifter 51 engaged in the fifth speed engaging position.

Figure 4:
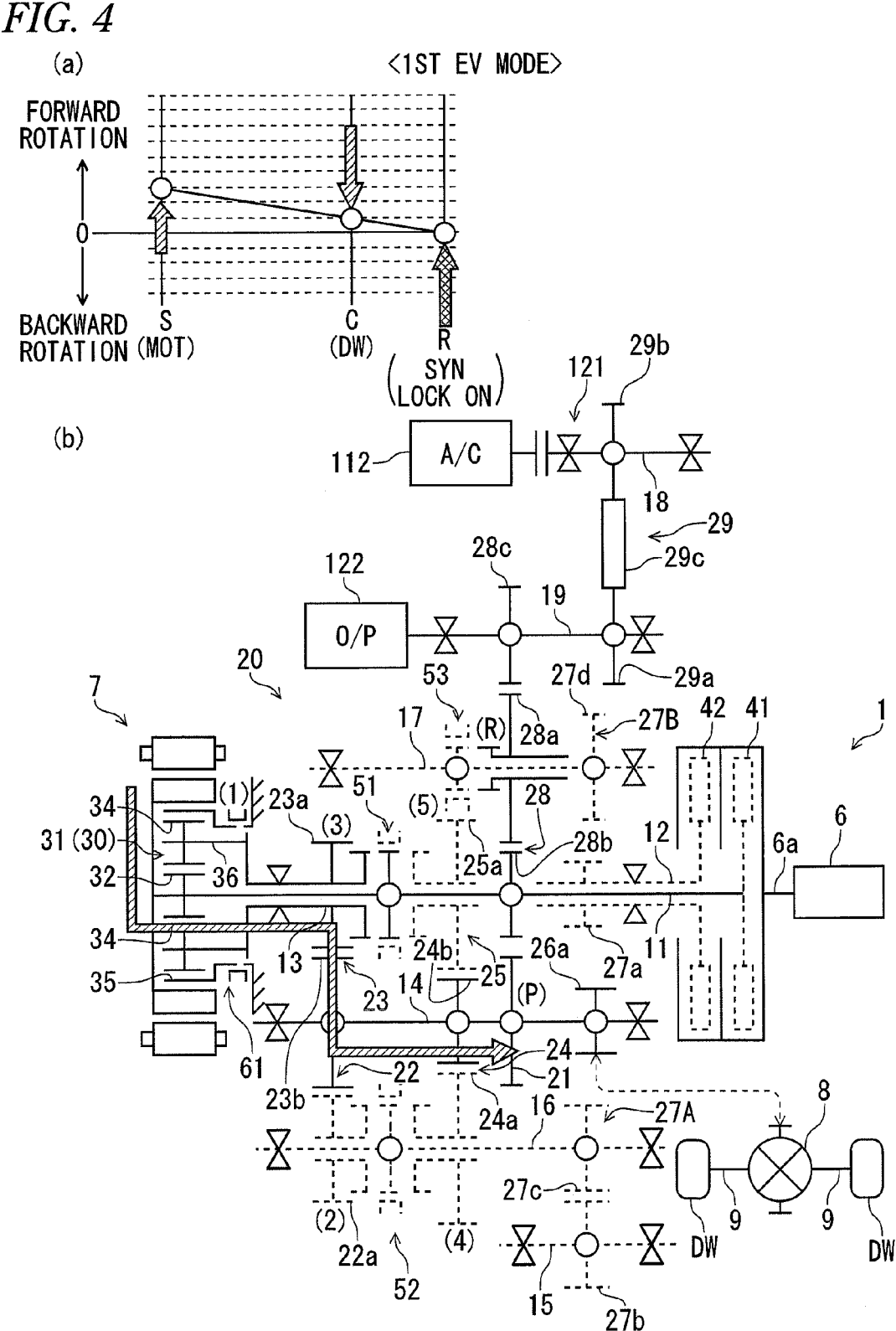
FIGS. 4(a) and 4(b) show the hybrid vehicle driving system operating in a $1^{st}$ EV mode, in which a speed diagram is shown at FIG. 4(a) and a diagram showing a torque transmitting condition is shown at FIG. 4(b).

Here, as an example of the EV driving, the first speed EV driving (the $1^{st}$ EV mode) will be described by reference to FIG. 4.

The $1^{st}$ EV mode is implemented by putting the brake mechanism 61 in a locked state (OWC Lock ON) from an initial state. When the motor 7 is driven (torque is applied in a forward rotating direction) in this state, as shown at (a) in FIG. 4, the sun gear 32 of the planetary gear mechanism 31 that is connected to the rotor 72 rotates in the forward rotating direction. As this occurs, as shown at (b) in FIG. 4, since the first and second clutches 41, 42 are disengaged, power transmitted to the sun gear 32 is not transmitted to the crankshaft 6a of the engine 6 from the first primary shaft 11. Then, since the brake mechanism 61 is locked, motor torque is transmitted from the sun gear 32 to the carrier 36 while being decelerated and is then transmitted to the driven wheels DW, DW by way of the fourth transmission line that passes through the third speed gear pair 23.

Additionally, reversing the vehicle in this $1^{st}$ EV mode can be implemented by driving the motor 7 in a backward rotating direction so as to apply the motor torque in the backward rotating direction.

When the vehicle is driven in the EV mode in this way, normally, the first and second clutches 41, 42 are disengaged, and the engine 6 is simply idling or is stopped. Incidentally, when the required driving force required on the vehicle increases while the vehicle is driven in the EV mode, the driving mode of the vehicle needs to be switched from the EV mode to a mode (an engine driving, an assisted driving or the like) where the vehicle is driven by use of the driving force of the engine 6. When this switching occurs, in the event that the engine 6 is idling while the vehicle is driven in the EV mode, it is necessary that the first clutch 41 or the second clutch 42 is applied and that the rotational speed of the first primary shaft 11 or the second primary shaft 12 is matched with the rotational speed of the crankshaft 6a. Additionally, when the engine 6 is stopped, in addition to the application of the first clutch 41 or the second clutch 42, it is also necessary that the engine 6 is started.

Incidentally, when a sport mode or a paddle shift is selected, it is considered that the driver is making a request for a quick response to an operation performed by the driver. When the quick response is requested in this way, in case the driver has to perform these various controls to switch the driving mode from the EV mode to another, there are caused fears that the request of the driver cannot be fulfilled.

Then, in the hybrid vehicle driving system 1 of this embodiment, when the driver request a quick response, the vehicle is allowed to be driven in the EV mode with the engine 6 running in the all cylinder deactivated operation while keeping the first clutch 41 or the second clutch 42 so that the driving mode can be switched quickly from the EV mode to the mode where the driving force of the engine 6 is used to drive the vehicle. Thus, even when the necessity occurs of driving the engine 6, the driving mode can be switched quickly only by switching the running state of the engine 6 to the all cylinder activated operation or the partial cylinder deactivated operation.

Figure 5:
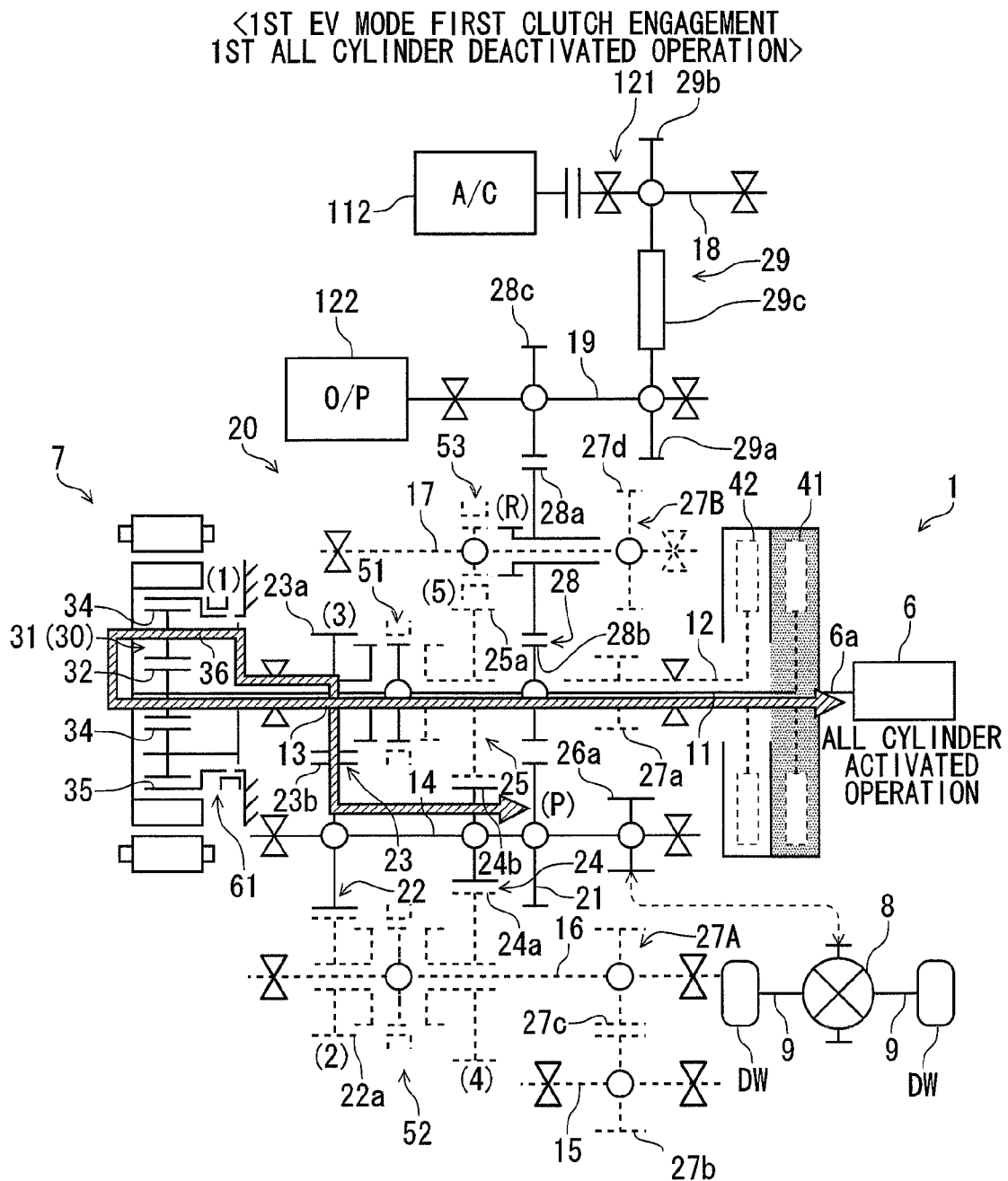
FIG. 5 is a diagram showing the hybrid vehicle driving system operating in a $1^{st}$ all cylinder deactivated operation in the $1^{st}$ EV mode.

FIG. 5 shows a case where the vehicle is driven in the $1^{st}$ EV mode and the engine 6 runs in the all cylinder deactivated operation with the first clutch 41 kept applied. As with the case shown in FIG. 4, in the $1^{st}$ EV mode, torque is transmitted from the sun gear 32 to the carrier 36 in response to the sun gear 32 of the planetary gear mechanism 31 rotating in the forward rotating direction and is then transmitted to the driven wheels DW, DW by way of the fourth transmission line which passes through the third drive gear pair 23. Additionally, since the first clutch 41 is applied, the sun gear 32 is connected directly to the first primary shaft 11 via the crankshaft 6a of the engine 6, and the crankshaft 6a rotates together with the first primary shaft 11.

In order to produce a state where the driving force of the engine 6 can be made use of from this state, since the first clutch 41 has already been applied, the variable valve timing mechanism 65 should be made to control to drive the cam lifting rocker arms (not shown) and the valve driving rocker arms (not shown) together. According to this configuration, since the rotational speed matching control becomes unnecessary which would otherwise be necessary to occur between the first primary shaft 11 and the crankshaft 6a when the first clutch 41 is applied, the engine 6 can be started without any delay.

In this way, according to the hybrid vehicle driving system 1 of this embodiment, the driving mode of the vehicle can quickly be shifted from the EV mode to the driving mode where the engine 6 is driven, and hence, the driver's demand for quick response can be fulfilled. Further, also in the following case other than the case described above where the quick response is demanded, the driving mode of the vehicle can quickly be shifted from the EV mode to the mode where the engine 6 is driven, thereby making it possible to realize a stable driving.

For example, in an automatic vehicle, when the vehicle is being driven at a constant speed by the driver applying a constant pedal effort to the accelerator pedal, that is, when the vehicle is traveling smoothly at a moderate speed (the vehicle is cruising), in the event that the driver drastically depresses the accelerator pedal, the ECU 5 executes a forced downshifting (kickdown) to drastically accelerate the vehicle. When this phenomenon occurs while the vehicle is being driven in the EV mode, in the event that it takes some time to drive the engine 6, there are caused fears that a shock is generated in the vehicle. In this embodiment, however, since the driving mode of the vehicle can quickly be shifted from the EV mode to the driving mode where the engine 6 is driven, even when the kickdown is executed, the engine 6 can be driven to realize a smooth acceleration, thereby making it possible to continue the stable driving. Consequently, even when the vehicle is cruising in the EV mode, it is preferable that the engine 6 is kept running in the all cylinder deactivated operation with the first clutch 41 or the second clutch 42 kept applied.

Additionally, when the vehicle is being driven only under inertia thereof with the driver applying no pedal effort to the accelerator pedal, that is, when the vehicle is being driven under inertia or is coasting down with the accelerator pedal idling, in the event that the driver depresses the accelerator pedal (chip-in), torque is momentarily increased. When this phenomenon occurs while the vehicle is being driven in the EV mode, in case it takes some time to drive the engine 6, there are caused fears that a shock is generated in the vehicle. In this embodiment, however, since the driving mode of the vehicle can quickly be shifted from the EV mode to the driving mode where the engine 6 is driven, the driving force of the engine 6 is increased in response to the chip-in so as to realize a smooth acceleration, whereby the vehicle can continue the stable driving. Consequently, even when the vehicle is coasting down in the EV mode, it is preferable that the engine 6 is kept running in the all cylinder deactivated operation with the first clutch 41 or the second clutch 42 kept applied.

Further, when the engine 6 is running in the all cylinder deactivated operation to execute a regeneration of electric energy while the vehicle is being decelerated, since no energy is consumed by the driving of the engine 6, the regeneration loss of energy can be reduced, and thus, more energy can be obtained through generation of electric energy, the fuel economy being thereby able to be improved. Consequently, even when the regeneration of electric energy is executed while the vehicle is being driven in the EV mode, it is preferable that the engine 6 is kept running in the all cylinder deactivated operation.

Figure 6:
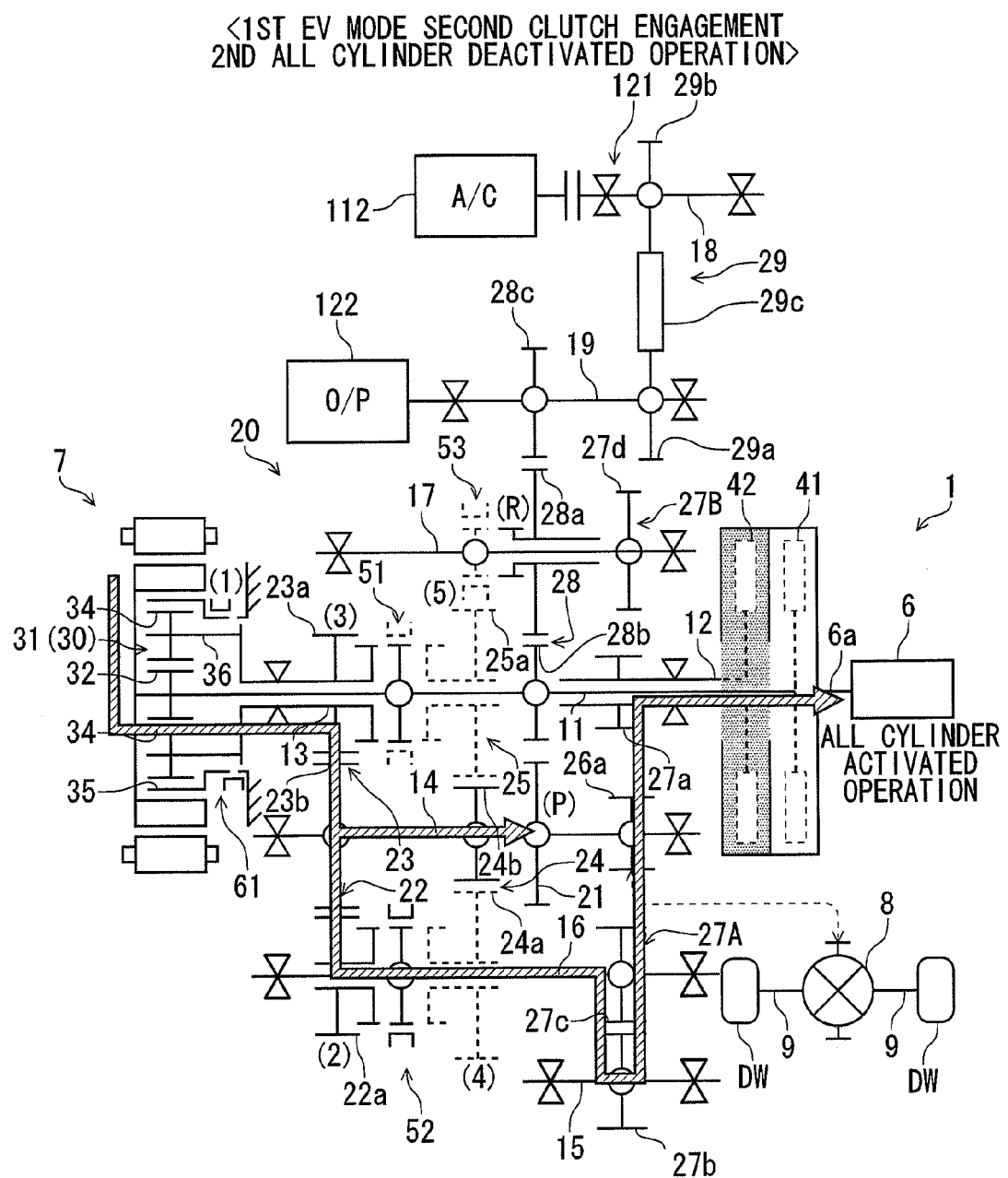
FIG. 6 is a diagram showing the hybrid vehicle driving system operating in a $2^{nd}$ all cylinder deactivated operation in the $1^{st}$ EV mode.

Additionally, when the vehicle speed is increased while the vehicle is driven in the EV mode, it is also possible to apply the second clutch 42 after a pre-shifting to the next higher gear has been implemented so that the vehicle can be driven in the next higher gear when the engine 6 is driven. FIG. 6 shows a case where the vehicle is driven in the second speed gear in the 1$^{st}$ EV mode with the second clutch 42 applied and the engine 6 running in the all cylinder deactivated operation. As with the case shown in FIG. 4, in the 1$^{st}$ EV mode, torque is transmitted from the sun gear 32 to the carrier 36 in response to the sun gear 32 of the planetary gear mechanism 31 rotating in the forward rotating direction by the driving of the motor 7 and is then transmitted to the driven wheels DW, DW by way of the fourth transmission line which passes through the third speed drive gear pair 23. Then, since the second gear shift shifter 52 is engaged in the second speed engaging position (a pre-shifting to the second speed gear is implemented) while the vehicle is driven in the 1$^{st}$ EV mode, the second speed drive gear 22a and the second intermediate shaft 16 rotate together with each other as the sun gear 32 rotates. By the rotation of the second intermediate shaft 16, the second primary shaft 12 rotates as a result of force being transmitted thereto from the second idle driven gear 27c that is mounted on the second intermediate shaft 16 via the first idle driven gear 27b, the idle drive gear 27a. By applying the second clutch 42 in this state, the crankshaft 6a rotates together with the second primary shaft 12.

In order to shift the driving mode from this state to the driving mode where the driving force of the engine 6 can be used, since the second clutch 42 has already been applied, the variable valve timing mechanism 65 should be made to control so that the cam lifting rocker arms (not shown) and the valve driving rocker arms (not shown) are driven together. According to this configuration, since the rotational speed matching control becomes unnecessary which would otherwise be necessary to occur between the second primary shaft 12 and the crankshaft 6a when the second clutch 42 is applied, the engine 6 can quickly be started in the next higher gear.

Figure 7:
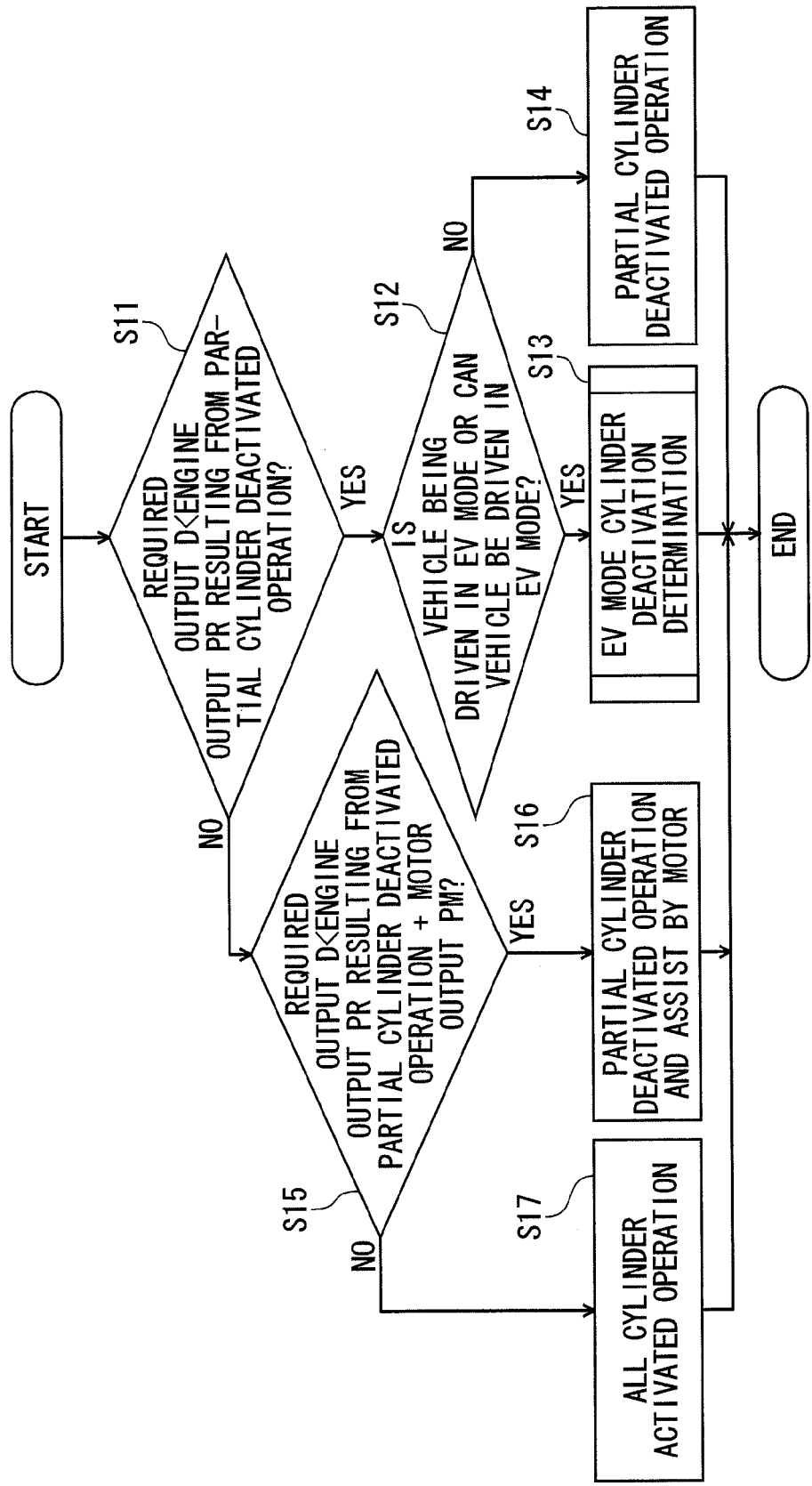
FIG. 7 is a flowchart showing the operation of a hybrid vehicle driving system of a first embodiment.

FIG. 7 is a flowchart illustrating the operation of the hybrid vehicle driving system 1 of this embodiment. Firstly, the ECU 5 determines whether or not a required output D required on the vehicle is smaller than an output Pr of the engine 6 when the engine 6 runs in the partial cylinder deactivated operation (step S11). In step S11, if it is determined that the required output D<the engine output Pr resulting from the partial cylinder deactivated operation, next, the ECU 5 determines whether or not the vehicle is currently being driven in the EV mode or the vehicle can be driven in the EV mode (step S12). Whether or not the vehicle can be driven in the EV mode is determined by the ECU 5 based on the required output D required on the vehicle, the SOC, temperature and the like of the battery 3. If it is determined in step S12 that the vehicle is currently being driven in the EV mode or the vehicle can be driven in the EV mode, the ECU 5 makes a determination on a cylinder deactivation in the EV mode (step S13).

Figure 8:
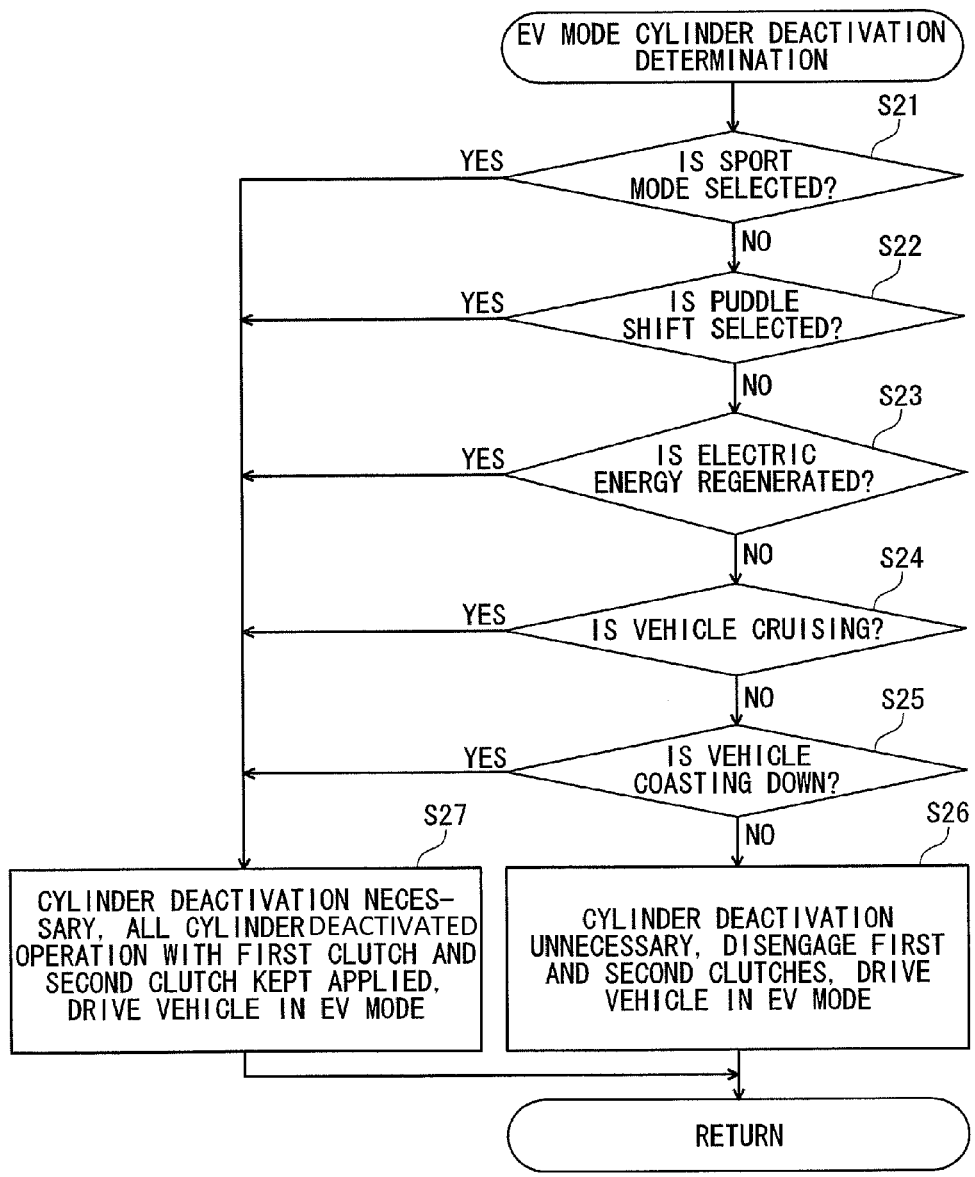
FIG. 8 is a flowchart showing a determination process of a cylinder deactivation in the EV mode.

FIG. 8 is a flowchart illustrating the process of the cylinder deactivation in the EV mode. Firstly, the ECU 5 determines whether or not the sport mode is currently selected (step S21). If it is determined in step S21 that the sport mode is not selected, next, the ECU 5 determines whether or not the paddle shift is selected (step S22). If it is determined in step S22 that the paddle shift is not selected, the ECU 5 determines whether the vehicle is currently being driven while executing regeneration (step S23). If it is determined in step S23 that the vehicle is not being driven while executing regeneration, the ECU 5 determines whether or not the vehicle is being driven with the accelerator pedal depressed constantly (the vehicle is cruising) (step S24). If it is determined in step S24 that the vehicle is not cruising, then, the ECU 5 determines whether or not the vehicle is traveling only under the inertia of the vehicle (the vehicle is coasting down) (step S25).

If it is determined in step S25 that the vehicle is not coasting down, the ECU 5 determines that the cylinder deactivation is not necessary and controls so that the vehicle is driven in the EV mode by the driving force of the motor 7 by disengaging the first and second clutches 41, 42 (step S26), ending the process.

In the event that it is understood that any of the determinations made in steps S21 to S25 is true, it is considered that the response of the engine 6 has significance, and therefore, the ECU 5 determines that the cylinder deactivation is necessary and controls so that the engine 6 runs in the all cylinder deactivated operation with the first clutch 41 or the second clutch 42 kept applied and the vehicle is driven in the EV mode by the driving force of the motor 7 (step S27), ending the process.

Returning to FIG. 7, if it is determined in step S12 that the vehicle is not being driven in the EV mode and that the vehicle cannot be driven in the EV mode, the ECU 5 controls so that the engine 6 runs in the partial cylinder deactivated operation (step S14), ending the process.

In addition, if it is determined in step S11 that the required output D is equal to or larger than the engine output Pr that results from the partial cylinder deactivated operation, that is, if it is determined that D≥Pr, the ECU 5 next determines whether or not the required output D is smaller than a sum of the engine output Pr resulting from the partial cylinder deactivated operation and a Pm of the motor 7, that is, whether or not D<Pr+Pm (step S15). If it is determined in step S15 that D<Pr+Pm, the ECU 5 controls so that the engine 6 runs in the partial cylinder deactivated operation and that a difference between the required output and the output of the engine 6 that results from the partial cylinder deactivated operation is outputted by the motor 7 (step S16), ending the process. Consequently, in this case, the vehicle is driven by causing the motor 7 to assist the engine 6 that runs in the partial cylinder deactivated operation.

If it is determined in step S15 that the required output D is equal to or larger than the sum of the engine output Pr that results from the partial cylinder deactivated operation and the Pm of the motor 7, that is, if it is determined that D≥Pr+Pm, the ECU 5 controls so that the engine 6 runs in the all cylinder activated operation (step S17), ending the process.

Thus, as has been described heretofore, according to the hybrid vehicle driving system 1 according to the embodiment, when the required driving force required on the vehicle is smaller than the driving force that results when the engine 6 runs in the partial cylinder deactivated operation, since the engine 6 is allowed to run in the partial cylinder deactivated operation as required, not only can the fuel economy be improved but also the engine 6 can quickly be driven when the driving force of the engine 6 becomes necessary. In particular, when the paddle shift that requires a quick response is selected or when the sport mode that requires a quick response is selected, the engine 6 can quickly be driven again. In addition, even when a gear change is implemented for kickdown or chip-in, the vehicle can be driven in a stable fashion with good response without generating any shock therein. Additionally, since the regeneration loss of energy can be reduced, the fuel economy can be improved further, and the engine 6 can be driven again further quickly. Further, since the running state of the engine 6 can be switched in accordance with the required driving force, the fuel economy can be improved furthermore.

Note that in making a determination on the necessity of cylinder deactivation, in addition to considering the conditions described above, information on road conditions that can be obtained from a navigation system, not shown, may be taken into consideration. When it is predicted based on these pieces of information that the engine 6 needs to be started early, it can be determined that the cylinder deactivation is necessary. According to this configuration, even when there is caused thereafter a situation where the vehicle needs to be driven by actually driving the engine 6, the engine 6 can quickly be driven again.

In addition, when a gear change is required while the engine 6 runs in the all cylinder deactivated operation or the partial cylinder deactivated operation, the required gear change can be implemented as follows.

For example, when the vehicle speed is increased while the vehicle is driven in the EV mode with the engine 6 running in the all cylinder deactivated operation, the vehicle is controlled so as to be driven in an even-numbered gear that is higher than the gear currently engaged next time the engine 6 is driven by implementing a pre-shifting to the higher gear and applying the second clutch 42. By doing this, re-driving the engine 6 in the next higher gear can quickly be executed.

In addition, for example, when the vehicle is decelerated, the rotational speed of the motor 7 is decreased, however, in the event that the rotational speed of the motor 7 is decreased to too low a level, it is difficult to execute the regeneration of electric energy. Then, in that case, in order to prevent the rotational speed of the motor 7 from being increased to too high a level, a control is made so that a gear change to a gear lower than the gear currently engaged is implemented. By doing this, the motor 7 is prevented from rotating insufficiently, thereby making it possible to execute the regeneration of electric energy with good efficiency.

Additionally, for example, when the vehicle climbs up along a road that slopes upwards in the EV mode, there occurs a situation in which the rotational speed of the motor 7 is increased. In this case, in order to prevent the rotational speed of the motor 7 from being increased to too high a level, a gear change to a gear that is higher than the currently engaged gear becomes necessary. As this occurs, when the vehicle is driven with the engine 6 running in the partial cylinder deactivated operation, a gear change to a higher even-numbered gear is implemented. In addition, when the vehicle is driven with the engine 6 running in the all cylinder deactivated operation and the required driving force is large, the gear is changed once to an even-numbered gear and is then changed to an odd-numbered gear. Alternatively, after torque is lost in an AMT gear change, for example, the gear is changed from the third speed gear to the fifth speed gear. When the required driving force is small, the gear is change to an even-numbered gear to decrease the rotational speed of the motor 7 and is then changed to an odd-numbered gear after waiting for the rotational speed to become a permissible rotational speed for the odd-numbered gear. By doing this, the motor 7 can be prevented from rotating excessively.

Modified Example

A modified example of the invention will be described herebelow by reference to FIG. 9. As to the configuration of this modified example, the description of like portions to those of the embodiment that has been described heretofore will be omitted.

In this modified example, when determining on a driving mode, a BSFC (Brake Specific Fuel Consumption) bottom operation output resulting from the all cylinder activated operation or the partial cylinder deactivated operation is taken into consideration. Here, the BSFC bottom operation output resulting from the all cylinder activated operation or the partial cylinder deactivated operation means an output at an operation point where the fuel consumption becomes the least while the vehicle is driven with the engine 6 running in the all cylinder activated operation or the partial cylinder deactivated operation. By adopting this configuration, in the modified example, it is possible to control so that the fuel consumption when the engine 6 runs becomes the least.

Figure 9:
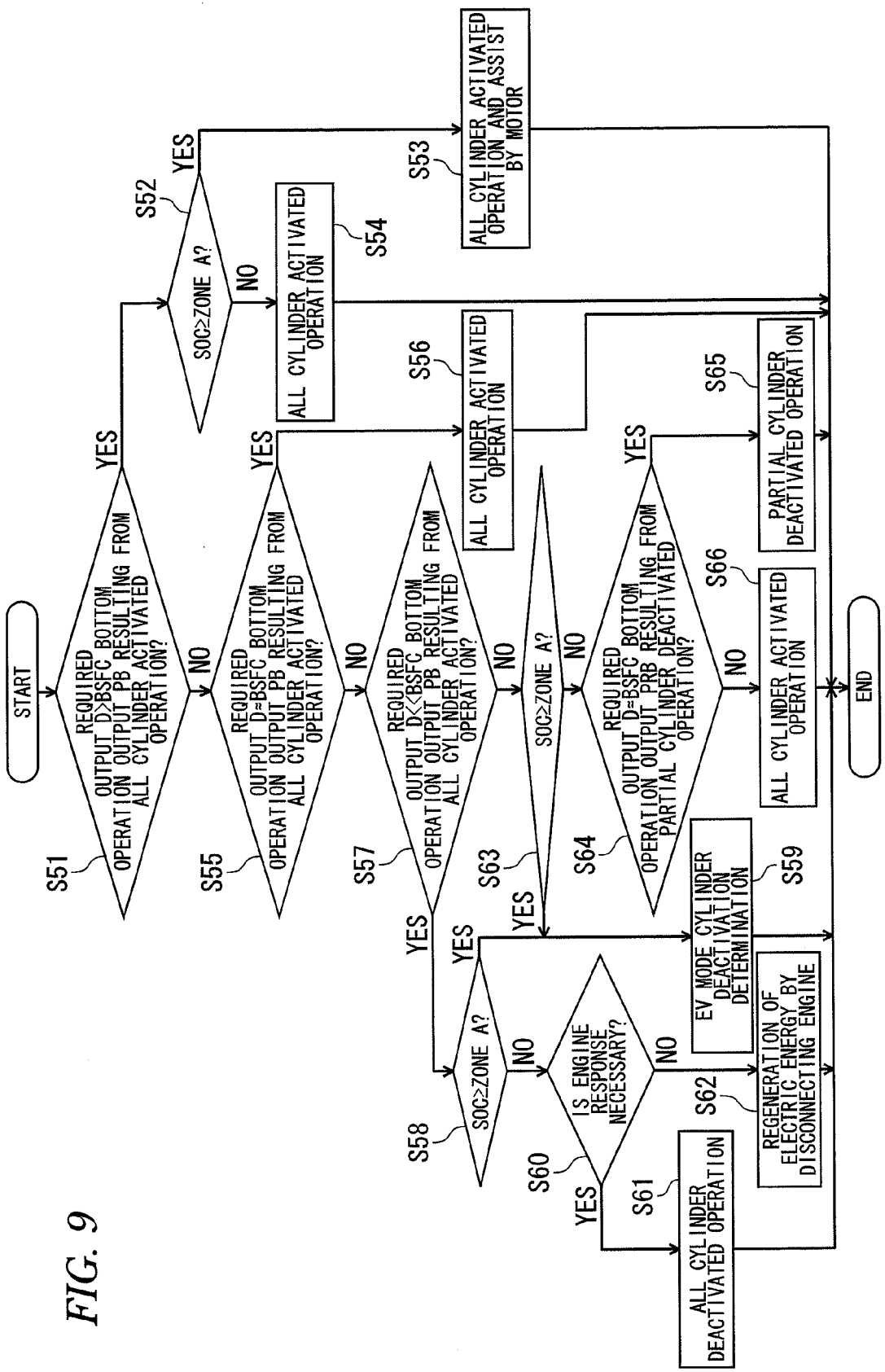
FIG. 9 is a flowchart showing the operation of a hybrid vehicle driving system of a modified example of the first embodiment.
Figure 10:
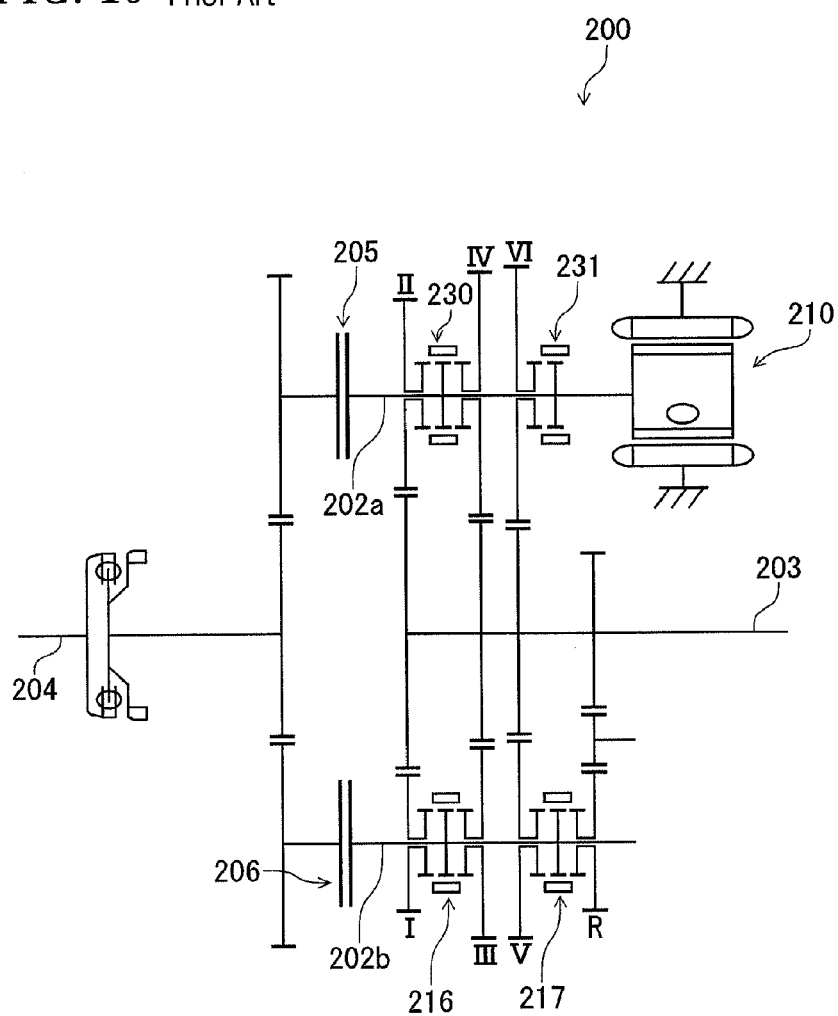
FIG. 10 is a schematic diagram of a vehicle driving system of Patent Document 1.

FIG. 9 is a flowchart illustrating the operation of a hybrid vehicle driving system 1 according to the modified example. Firstly, an ECU 5 compares a BSFC bottom operation output Pb resulting from the all cylinder activated operation with a required output D required on a vehicle (step S51). If it is determined in step S51 that D>Pb, the ECU 5 determines on the current SOC of a battery 3 (step S52). If it is determined in step S52 that the SOC of the battery 3 indicates a value that is equal to or larger than a zone A (refer to FIG. 3), the ECU 5 controls so that an engine 6 runs in the all cylinder activated operation and that a difference between the required output D and the BSFC bottom operation output Pb resulting from the all cylinder activated operation is outputted by a motor 7 (step S53), ending the process. Consequently, in this case, the vehicle is driven by assisting the engine 6 that runs in the all cylinder activated operation by the motor 7. Thus, since the engine 6 is allowed to run at the operation point where the fuel consumption becomes the least, the fuel economy can be improved by reducing the fuel consumption to the least level.

If it is determined in step S52 that the SOC of the battery 3 indicates a value that is smaller than the zone A (refer to FIG. 3), the ECU 5 controls so that the engine 6 runs in the all cylinder activated operation (step S54), ending the process.

If it is determined in step S51 that D≤Pb, the ECU 5 compares again the BSFC bottom operation output Pb resulting from the all cylinder activated operation with the required output D required on the vehicle (step S55). If it is determined in step S55 that a difference between the BSFC bottom operation output Pb resulting from the all cylinder activated operation and the required output D required on the vehicle is less than a first predetermined value, that is, if it is determined that the required output D and the BSFC bottom operation output Pb resulting from the all cylinder activated operation are substantially equal (D≈Pb) to each other, it is controlled so that the engine 6 runs in the all cylinder activated operation (step S56), ending the process. In this case, since the engine 6 is allowed to run at the operation point where the fuel consumption becomes the least, the fuel economy can be improved by reducing the fuel consumption to the least level.

If it is determined in step S55 that the difference between the BSFC bottom operation output Pb resulting from the all cylinder activated operation and the required output D required on the vehicle is equal to or larger than the first predetermined value and that D≈Pb is not true, the ECU 5 compares further the BSFC bottom operation output Pb resulting from the all cylinder activated operation with the required output D required on the vehicle (step S57). Specifically, it is determined in step S57 whether or not the difference between the BSFC bottom operation output Pb resulting from the all cylinder activated operation and the required output D required on the vehicle is equal to or larger than a second predetermined value that is larger than the first predetermined value, that is, it is determined whether or not D<<Pb. Not that if it is determined here that D<<Pb, there is occurring a situation where the required output required on the vehicle is extremely low to be close to zero or a situation where with a braking force required, a brake pedal (not shown) is depressed.

If it is determined in step S57 that the difference between the BSFC bottom operation output Pb resulting from the all cylinder activated operation and the required output D required on the vehicle is equal to or larger than the second predetermined value that is larger than the first predetermined value and that D<<Pb, the ECU 5 determines on the current SOC of the battery 3 (step S58).

If it is determined in step S58 that the SOC of the battery 3 indicates a value that is equal to or larger than the zone A, since the vehicle can be driven in an EV mode (refer to FIG. 3), the ECU 5 makes a determination on a cylinder deactivation in the EV mode (step S59), ending the process. Since the respective steps in determining on the cylinder deactivation in the EV mode are similar to the respective steps (FIG. 8) described in the first embodiment, the description of the steps will be omitted here.

If it is determined in step S58 that the SOC of the battery 3 is a value that is less than the zone A, the vehicle cannot be driven in the EV mode (refer to FIG. 3). In this case, the ECU 5 determines whether or not the response of the engine 6 is required (step S60). Here, the case where the response of the engine 6 is required is, for example, a case where a paddle shift is selected or a case where a sport mode is selected.

If it is determined in step S60 that the response of the engine 6 is required, the ECU 5 controls so that the vehicle is driven smoothly at a moderate speed (cruises) or the vehicle travels under the inertia thereof by causing the engine 6 to run in the all cylinder deactivated operation (step S61), ending the process. By doing this, the braking force can be obtained.

If it is determined in step S60 that the response of the engine 6 is not required, the ECU 5 controls so that the engine 6 is disconnected by disengaging the first and second clutches 41, 42 and that the regeneration of electric energy is executed by the motor 7 (step S61), ending the process. By doing this, the battery 3 can be charged and the braking force can be obtained.

If it is determined in step S57 that the difference between the BSFC bottom operation output Pb resulting from the all cylinder activated operation and the required output D required on the vehicle is equal to or larger than the first predetermined value but is less than the second predetermined value, that is, if it is determined that D<Pb is true but D<<Pb is not true, the ECU 5 determines on the current SOC of the battery 3 (step S63). If it is determined in step S63 that the SOC of the battery 3 indicates a value that is equal to or larger than the zone A, since the vehicle can be driven in the EV mode (refer to FIG. 3), the ECU 5 makes a determination on the cylinder deactivation in the EV mode (step S59), ending the process. Since the respective steps in determining on the cylinder deactivation in the EV mode are similar to the respective steps (FIG. 8) described in the first embodiment, the description of the steps will be omitted here.

If it is determined in step S63 that the SOC of the battery 3 is a value that is less than the zone A, the vehicle cannot be driven in the EV mode (refer to FIG. 3). In this case, the ECU 5 compares a BSFC bottom operation output Prb resulting from the partial cylinder deactivated operation with the required output D required on the vehicle (step S64). If it is determined in step S64 that a difference between the BSFC bottom operation output Prb resulting from the partial cylinder deactivated operation and the required output D required on the vehicle is less than the first predetermined value, that is, if it is determined that the required output D and the BSFC bottom operation output Prb resulting from the partial cylinder deactivated operation are substantially equal (D≈Prb) to each other, the ECU 5 controls so that the engine 6 runs in the partial cylinder deactivated operation (step S65), ending the process. In this case, since the engine 6 is allowed to run at the operation point where the fuel consumption becomes the least, and therefore, with the fuel consumption made the least, the fuel economy can be improved.

If it is determined in step S64 that the difference between the BSFC bottom operation output Prb resulting from the partial cylinder deactivated operation and the required output D required on the vehicle is a value equal to or larger than the first predetermined value and that D≈Prb is not true, the ECU 5 controls so that the vehicle is driven with the engine 6 running in the all cylinder activated operation (step S66), ending the process.

The invention is not limited by the embodiment that has been described before and the modified example, and hence, the invention can be modified or improved as required.

For example, in the embodiment that has been described before and the modified example, the odd-numbered gears are disposed on the first primary shaft 11 that is the input shaft to which the motor 7 of the dual-clutch transmission is connected, while the even-numbered gears are disposed on the second intermediate shaft 16 to which the motor 7 is not connected. However, the invention is not limited to this configuration, and hence, the even-numbered gears may be disposed on the first primary shaft 11 that is the input shaft to which the motor 7 is connected, while the odd-numbered gears may be disposed on the second intermediate shaft 16 to which the motor 7 is not connected.

In addition, as odd-numbered gears, in addition to the planetary gear mechanism 30 as the first speed drive gear, the third speed drive gear 23a and the fifth speed drive gear 25a, a seventh speed drive gear, a ninth speed drive gear and further higher or faster speed drive gears may be provided, while as even-numbered gears, in addition to the second speed drive gear 22a and the fourth speed drive gear 24a, a sixth speed drive gear, an eighth speed drive gear and further higher or faster speed drive gears may be provided.

Note that the invention is based on Japanese Patent Application No. 2010-136541 filed on Jun. 15, 2010, the contents of which are incorporated herein by reference.

DESCRIPTION OF REFERENCE NUMERALS AND CHARACTER

1 Hybrid vehicle driving system
3 Battery (Battery)
5 ECU
6 Engine (Internal combustion engine)
7 Motor (Electric motor)
11 First primary shaft (First input shaft)
14 Counter shaft (Output shaft)
16 Second intermediate shaft (Second input shaft)
41 First clutch (First engaging and disengaging means)
42 Second clutch (Second engaging and disengaging means)
51 First gear shift shifter
52 Second gear shift shifter
20 Transmission

The invention claimed is:

1. A hybrid vehicle driving system adapted to be used in a hybrid vehicle including an internal combustion engine that can be switched to an all cylinder activated operation where all cylinders are activated for operation and a cylinder deactivated operation where at least part of the cylinders is deactivated for rest, an electric motor and a transmission, as drive sources, the hybrid vehicle driving system comprising:

a battery that supplies electric power to the electric motor;

a first change-speed mechanism where mechanical power from an output shaft of the internal combustion engine and the electric motor is borne by a first input shaft that engages with the electric motor and any of a plurality of change-speed gears is engaged so that the first input shaft is engaged with driven wheels;

a second change-speed mechanism where mechanical power from the output shaft of the internal combustion engine is borne by a second input shaft and any of a plurality of change-speed gears is engaged so that the second input shaft is engaged with the driven wheels;

a first engaging and disengaging portion that can engage the output shaft of the internal combustion engine with the first input shaft; and a second engaging and disengaging portion that can engage the output shaft of the internal combustion engine with the second input shaft, wherein:

the hybrid vehicle can be driven in an EV mode only by a driving force of the electric motor via the first input shaft, the hybrid vehicle driving system characterized by further comprising a cylinder deactivated operation necessity determination unit for determining on the necessity of the internal combustion engine running in the cylinder deactivated operation when a required driving force required on the vehicle is smaller than a driving force resulting when the internal combustion engine runs in the cylinder deactivated operation;

when a quick response is required, and when the cylinder deactivated operation is determined to be unnecessary by the cylinder deactivated operation necessity determination unit, the vehicle is configured to operate in the EV mode by disengaging the first engaging and disengaging portion and the second engaging and disengaging portion; and when the cylinder deactivated operation is determined to be necessary by the cylinder deactivated operation necessity determination unit, the internal combustion engine runs in the cylinder deactivated operation and at least one of the first engaging and disengaging portion and the second engaging and disengaging portion is engaged.

2. The hybrid vehicle driving system according to claim 1, wherein
the cylinder deactivated operation necessity determination unit determines that the cylinder deactivated operation is necessary when a paddle shift is selected.

3. The hybrid vehicle driving system according to claim 1, wherein
the cylinder deactivated operation necessity determination unit determines that the cylinder deactivated operation is necessary when a sport mode is selected.

4. The hybrid vehicle driving system according to claim 1, wherein
the cylinder deactivated operation necessity determination unit determines that the cylinder deactivated operation is necessary when a regeneration of electric energy is executed by the electric motor.

5. The hybrid vehicle driving system according to claim 1, wherein the cylinder deactivated operation necessity determination unit determines that the cylinder deactivated operation is necessary when the vehicle is cruising.

6. The hybrid vehicle driving system according to claim 1, wherein
the cylinder deactivated operation necessity determination unit determines that the cylinder deactivated operation is necessary when the vehicle is coasting down.

7. The hybrid vehicle driving system according to claim 1, wherein
when the vehicle is driven in the EV mode with the internal combustion engine running in the cylinder deactivated operation while keeping the first engaging and disengaging portion engaged, a pre-shifting to the second input shaft is implemented and the first engaging and disengaging portion is switched to the second engaging and disengaging portion for engagement with the second input shaft.

8. The hybrid vehicle driving system according to claim 1, further comprising:
a driving state predicting unit that liaises with a car navigation system, wherein
the cylinder deactivated operation necessity determination unit determines that the cylinder deactivated operation is necessary when a switching from the EV mode to a different driving mode is predicted by the driving state predicting unit.

9. The hybrid vehicle driving system according to claim 1, further comprising:

an electronic control throttle that can control the amount of induction air induced into the internal combustion engine, wherein:

when the required driving force required on the vehicle is smaller than the driving force resulting when the internal combustion engine runs in the cylinder deactivated operation, a control is made so that the internal combustion engine runs in the cylinder deactivated operation and that an opening of the electronic control throttle is increased as the required driving force is increased;

when the required driving force required on the vehicle is larger than the driving force of the internal combustion engine that runs in the cylinder deactivated operation and is smaller than a sum of the driving force of the internal combustion engine that runs in the cylinder deactivated operation and a driving force that can be outputted by the electric motor, a control is made so that the internal combustion engine runs in the cylinder deactivated operation and that the electric motor is made to output a difference between the required driving force and the driving force of the internal combustion engine that runs in the cylinder deactivated operation; and when the required driving force required on the vehicle is larger than the sum of the driving force of the internal combustion engine that runs in the cylinder deactivated operation and the driving force that can be outputted by the electric motor, a control is made so that the internal combustion engine is switched from the cylinder deactivated operation to an all cylinder activated operation and that the opening of the electronic control throttle is changed to an opening that corresponds to the all cylinder activated operation.

10. The hybrid vehicle driving system according to claim 1, wherein the cylinder deactivated operation includes a partial cylinder deactivated operation where the engine runs with only part of the cylinder deactivated for rest and an all cylinder deactivated operation where the engine runs with all the cylinders deactivated;

when the required driving force required on the vehicle is smaller than a driving force of the internal combustion engine that runs in the all cylinder activated operation and a BSFC bottom operation is enabled by the internal combustion engine that runs in the partial cylinder deactivated operation, a control is made so that the internal combustion engine runs in the partial cylinder deactivated operation; and when the required driving force required on the vehicle is smaller than the driving force of the internal combustion engine that runs in the all cylinder activated operation and a difference therebetween is equal to or larger than a predetermined value, a control is made so that the vehicle is driven in the EV mode or the internal combustion engine runs in the all cylinder deactivated operation in accordance with a state of charge of the battery and the required driving force.

* * * * *